(12) United States Patent
Tanikawa et al.

(10) Patent No.: US 8,511,289 B2
(45) Date of Patent: Aug. 20, 2013

(54) INTAKE MANIFOLDS

(75) Inventors: Hironori Tanikawa, Anjyo (JP);
Yukihiro Doko, Aichi-ken (JP); Kenji Kusuda, Tokai (JP); Tomomi Ota, Chiryu (JP); Xiaomin Pan, Nagoya (JP);
Ichiro Hisada, Tokoname (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 605 days.

(21) Appl. No.: 12/780,024

(22) Filed: May 14, 2010

(65) Prior Publication Data

US 2010/0288247 A1 Nov. 18, 2010

(30) Foreign Application Priority Data

May 18, 2009 (JP) .................. 2009-120154
May 18, 2009 (JP) .................. 2009-120156

(51) Int. Cl.
*F02M 35/104* (2006.01)
(52) U.S. Cl.
USPC ............ 123/568.17; 123/184.42; 123/184.47; 123/184.61
(58) Field of Classification Search
USPC .................. 123/184.47, 184.42, 308, 568.17, 123/184.61, 55, 184.21, 184.24, 572
See application file for complete search history.

(56) References Cited

U.S. PATENT DOCUMENTS

| | | | | |
|---|---|---|---|---|
| 6,098,586 A * | 8/2000 | Bloomer | ................ | 123/184.21 |
| 6,155,223 A * | 12/2000 | Miazgowicz | ............ | 123/184.35 |
| 6,167,865 B1 * | 1/2001 | Ma | ................ | 123/308 |
| 6,427,655 B2 * | 8/2002 | Itoh et al. | ................ | 123/184.42 |
| 6,666,182 B2 * | 12/2003 | Schermuly et al. | ...... | 123/184.55 |
| 6,691,686 B2 * | 2/2004 | Klas et al. | ................ | 123/568.17 |
| 6,807,957 B2 * | 10/2004 | Ko | ................ | 123/572 |
| 6,988,478 B2 * | 1/2006 | Tanikawa et al. | ........ | 123/184.42 |
| 7,100,559 B2 * | 9/2006 | Uchiyama | ................ | 123/184.38 |
| 7,237,541 B2 * | 7/2007 | Vanderveen et al. | .... | 123/568.17 |
| 7,305,958 B2 * | 12/2007 | Doko et al. | ............. | 123/184.21 |
| 7,357,110 B2 * | 4/2008 | Hashimoto et al. | ...... | 123/184.47 |
| 7,451,732 B1 * | 11/2008 | Vichinsky et al. | ....... | 123/184.47 |
| 8,011,352 B2 * | 9/2011 | Shinkai et al. | ........... | 123/568.17 |
| 8,186,324 B2 * | 5/2012 | Iwata | ....................... | 123/184.61 |
| 2006/0201470 A1 * | 9/2006 | Vichinsky | ................ | 123/184.61 |
| 2008/0011259 A1 * | 1/2008 | Madeira | ................... | 123/184.61 |
| 2009/0071431 A1 * | 3/2009 | Fujimori et al. | ......... | 123/184.55 |

FOREIGN PATENT DOCUMENTS

| | | |
|---|---|---|
| JP | 09133056 | 5/1997 |
| JP | 10-077917 | 3/1998 |
| JP | 2001-140713 | 5/2001 |
| JP | 2002106432 | 4/2002 |
| JP | 2003-239816 | 8/2003 |
| JP | 2003-314391 | 11/2003 |
| JP | 2004-251163 | 9/2004 |
| JP | 2005076503 | 3/2005 |
| JP | 2007-016728 | 1/2007 |
| JP | 2007132198 | 5/2007 |
| JP | 2008069755 | 3/2008 |
| JP | 2009-127536 | 6/2009 |
| JP | 2010-265871 | * 11/2010 |

* cited by examiner

*Primary Examiner* — Hai Huynh
(74) *Attorney, Agent, or Firm* — Ladas & Parry, LLP

(57) ABSTRACT

An intake manifold includes a surge tank chamber, a plurality of branch passages and a gas tank chamber capable of introducing a gas and distributing the gas into the plurality of branch passages. The gas is to be refluxed to an engine.

21 Claims, 27 Drawing Sheets

INTAKE MANIFOLDS

This application claims priorities to Japanese patent application serial numbers 2009-120154 and 2009-120156, the contents of which are incorporated herein by reference.

BACKGROUND OF THE INVENTION

1. Field of the Invention

The present invention relates to intake manifolds used for engines, in particular, internal combustion engines.

2. Description of the Related Art

A known intake manifold is disclosed, for example, in Japanese Laid-Open Patent Publication No. 2008-69755. The intake manifold disclosed in this publication is configured to distribute gas, such as blow-by gas to be refluxed to an engine, into a plurality of branch passages via a surge tank.

Japanese Laid-Open Patent Publication No. 2005-76503 teaches a technique of defining a surge tank chamber by a plurality of separate resin pieces that are welded together to form an intake manifold.

There is a need in the art for an improved intake manifold.

SUMMARY OF THE INVENTION

An intake manifold includes a gas tank chamber communicating with a plurality of branch passages, so that a gas entering the gas tank chamber can flow into the branch passages without flowing through a surge tank.

DETAILED DESCRIPTION OF THE INVENTION

Figure 1:
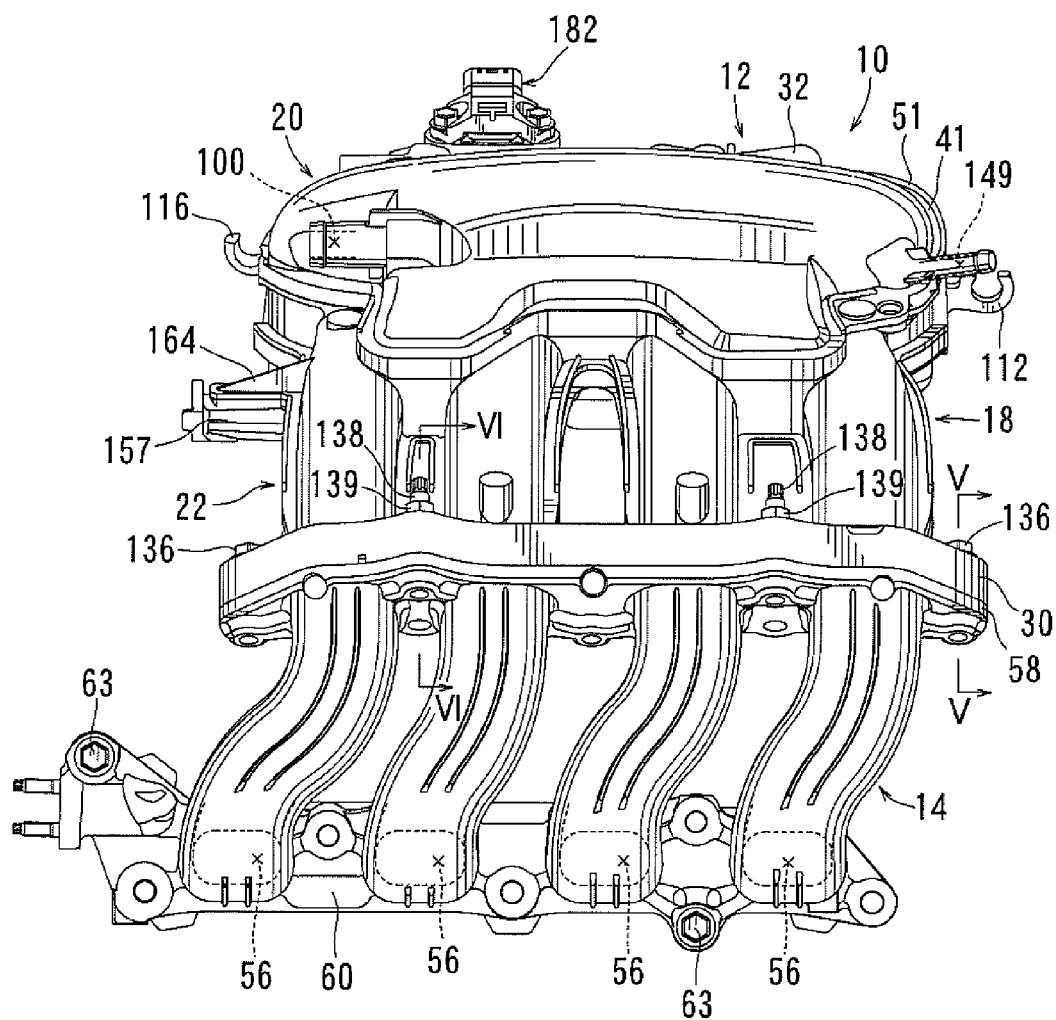
FIG. 1 is a front view of an intake manifold according to an example.

Each of the additional features and teachings disclosed above and below may be utilized separately or in conjunction with other features and teachings to provide improved intake manifolds. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Furthermore, although each of the representative examples can achieve various objects, it may be still technically useful even modified to achieve only one of the objects.

In one example, an intake manifold includes a surge tank chamber, a plurality of branch passages and a gas tank chamber capable of introducing a gas and distributing the gas into the plurality of branch passages. The gas is adapted to be refluxed to an engine.

Therefore, the gas can be mixed within the gas tank chamber and can be distributed directly into the branch passages without flowing through the surge tank. As a result it is possible to distribute the gas equally into the branch passages. The gas may be a blow-by gas, a purge gas or an EGR gas.

Passage walls defining the plurality of branch passages may be formed integrally with a tank wall defining the gas tank chamber. With this arrangement, it is possible to improve the rigidity of the intake manifold and to downsize the intake manifold.

The surge tank chamber and the gas tank chamber may be positioned proximal to each other with an intervention of a partition wall. Also with this arrangement, it is possible to improve the rigidity of the intake manifold and to downsize the intake manifold.

In another example, an intake manifold includes a plurality of manifold pieces made of resin and welded together to jointly form a circumferential wall defining therein a surge tank chamber. The circumferential wall includes a side wall including a boundary plane of the surge tank chamber between at least two of the welded manifold pieces. The side wall has a double wall structure including an inner wall and an outer wall defining therebetween a communication passage communicating with the surge tank chamber With this arrangement, because the side wall has a double wall structure, it is possible to improve the pressure resistant strength of the side wall. In addition, it is possible to provide the communication passage by utilizing a space between the inner and outer walls.

Each of the at least two of the welded pieces may include an inner wall part and an outer wall part. The inner wall parts of the at least two of the welded manifold pieces are welded together to form the inner wall, and the outer wall parts of the at least two of the welded manifold pieces are welded together to form the outer wall. Therefore, the side wall has a double welded wall structure. Hence, it is possible to further improve the pressure resistant strength of the side wall.

The at least one of the manifold pieces may include a joint flange for welding to the other manifold piece and has an outer surface including at least one reinforcing rib formed thereon. The joint flange includes a linear projection. The at least one reinforcing rib extends in a direction intersecting with the linear projection, and the linear projection is interrupted at a position where the reinforcing rib intersects the linear projection. Therefore, the linear projection and the reinforcing rib are provided separately from each other. This arrangement allows the base end of the reinforcing rib to have an inclination surface with a large radius of curvature in comparison with the arrangement where the linear projection and the reinforcing rib are provided in series with each other. Thus, in the case that the reinforcing rib is formed in series with the linear projection, only a small radius of curvature can be given to an inclination surface of the base end of the rib because of a design of a molding die, and therefore, it is liable to cause concentration of stress at the base end.

A honeycomb rib may be formed on an outer surface of the circumferential wall of the surge tank. With this arrangement, it is possible to improve the strength of the circumferential wall. In addition, because the force is transmitted along the honeycomb rib in the radial direction, it is possible to mitigate potential concentration of stress and to eventually improve the pressure resistant strength of the circumferential wall. In addition, the honeycomb rib can reduce vibrations of the circumferential wall. Further, one honeycomb segment of the honeycomb rib may have a large area than one grid segment of a grid-like rib having the same circumferential length as the honeycomb segment. Therefore, it is possible to reduce the amount of material and to reduce the material cost. Further, the honeycomb rib may give an excellent appearance, and therefore, it is possible to improve in terms of design.

In another example, an intake manifold includes a first manifold piece and a second manifold piece welded together to jointly form a circumferential wall defining therein a surge tank chamber. The circumferential wall includes an inner wall and an outer wall defining therebetween a communication passage communicating with the surge tank chamber.

Each of the first and second manifold pieces may include an inner wall part and an outer wall part, the inner wall parts of the first and second pieces are welded together to form the inner wall, and the outer wall parts of the first and second pieces are welded together to form the outer wall.

The first manifold piece includes a joint flange for welding to the second manifold piece and has an outer surface including at least one reinforcing rib formed thereon, the joint flange includes a linear projection extending in a direction intersecting with the joint flange, and the linear projection is interrupted at a position where the at least one reinforcing rib intersects the linear projection. A honeycomb rib may be formed on an outer surface of the circumferential wall of the surge tank.

In another embodiment, an intake manifold includes a first manifold piece, a second manifold piece and a third manifold piece welded together to jointly form a circumferential wall defining therein a surge tank chamber. The circumferential wall includes a first wall part formed by the first and second manifold pieces and a second wall part formed by the first and third manifold pieces. The first wall part has an inner wall and an outer wall defining therebetween an upstream side communication passage. The second wall part has an inner wall and an outer wall defining therebetween a downstream side communication passage communicating with the upstream side communication passage and also communicating with the surge tank chamber.

First Example

A first example will now be described with reference to FIGS. 1 to 29. In this example, an intake manifold used for an in-line four cylinder engine will be described. For the purpose of explanation, a basic structure of the intake manifold will be first described and an explanation of details of an intake manifold body will follow.

(Basic Structure of Intake Manifold)

The basic structure of the intake manifold will now be described. The intake manifold is shown in a front view, a left side view, a right side view and a rear view in FIGS. 1, 2, 3 and 4, respectively.

Figure 2:
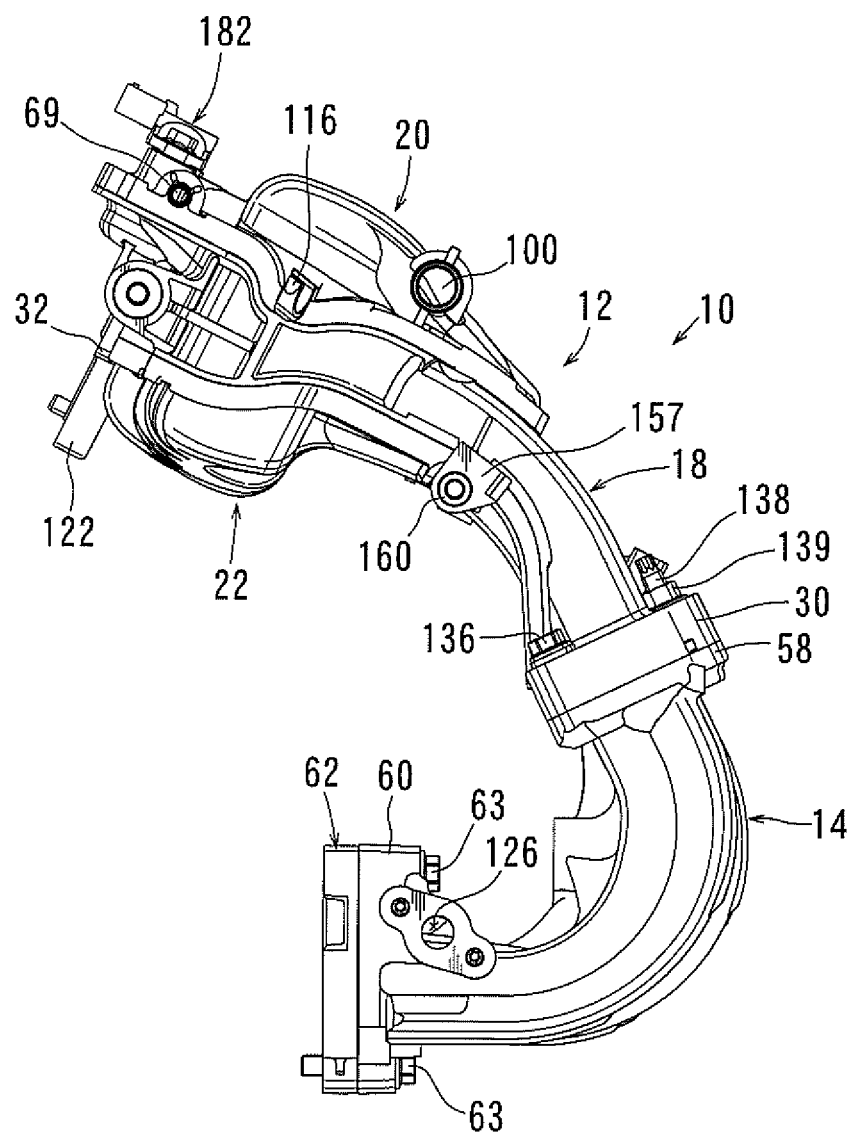
FIG. 2 is a left side view of the intake manifold.
Figure 3:
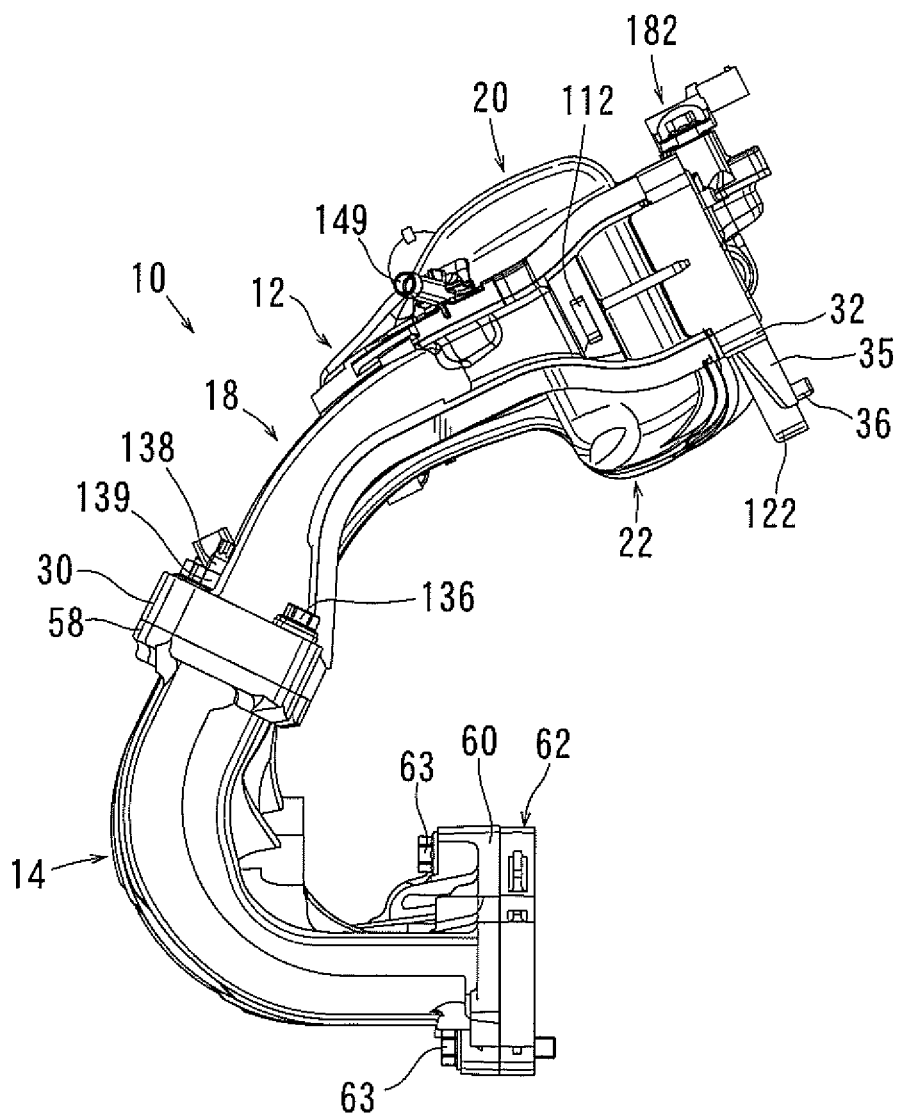
FIG. 3 is a right side view of the intake manifold.
Figure 4:
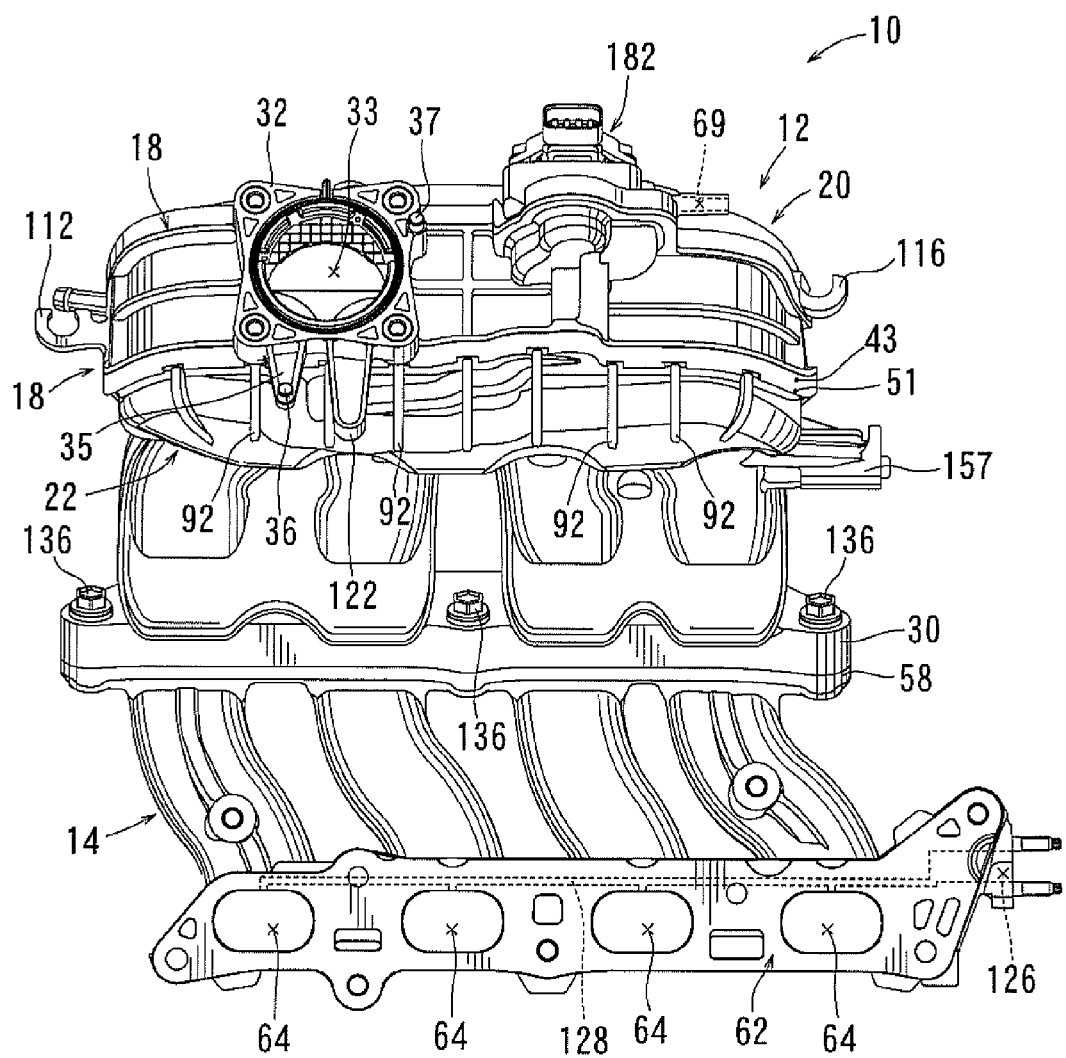
FIG. 4 is a rear view of the intake manifold.

Referring to FIG. 1, an intake manifold 10 generally includes a manifold body 12 and a connecting member 14 connected to a downstream-side with respect to flow of intake air of the manifold body 12 (see FIGS. 2 to 4). The manifold body 12 is shown in a front view, a left side view and a right side view in FIGS. 7, 8 and 9, respectively.

Figure 8:
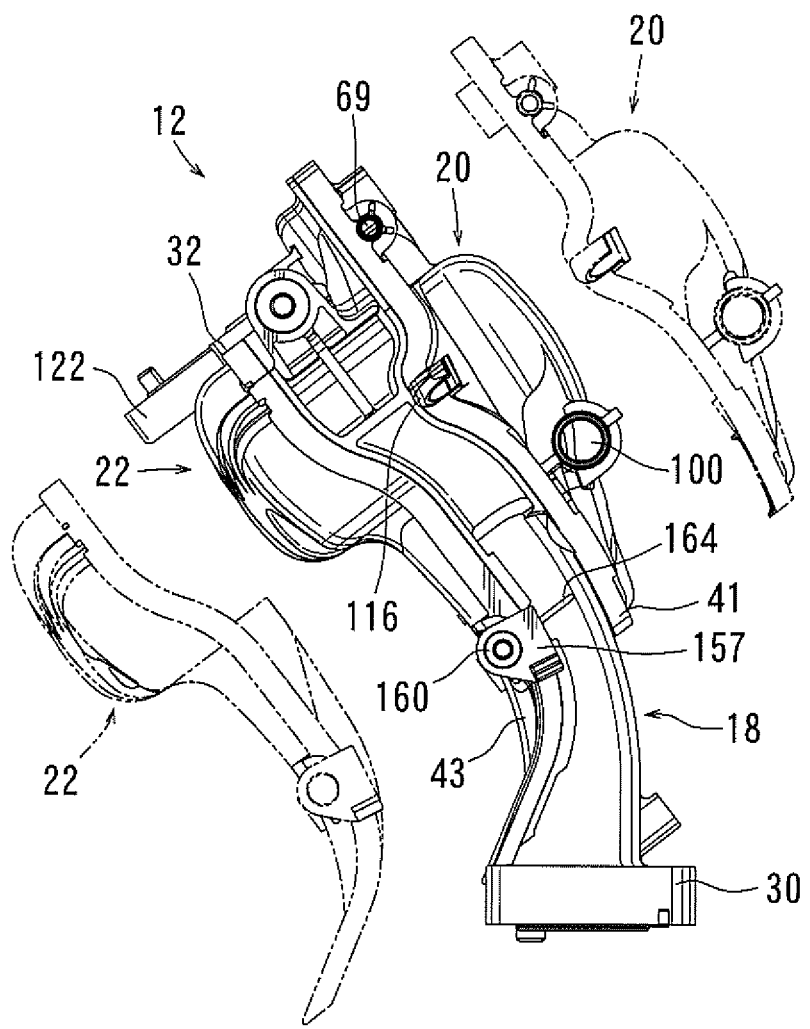
FIG. 8 is a left side view of the manifold body.
Figure 9:
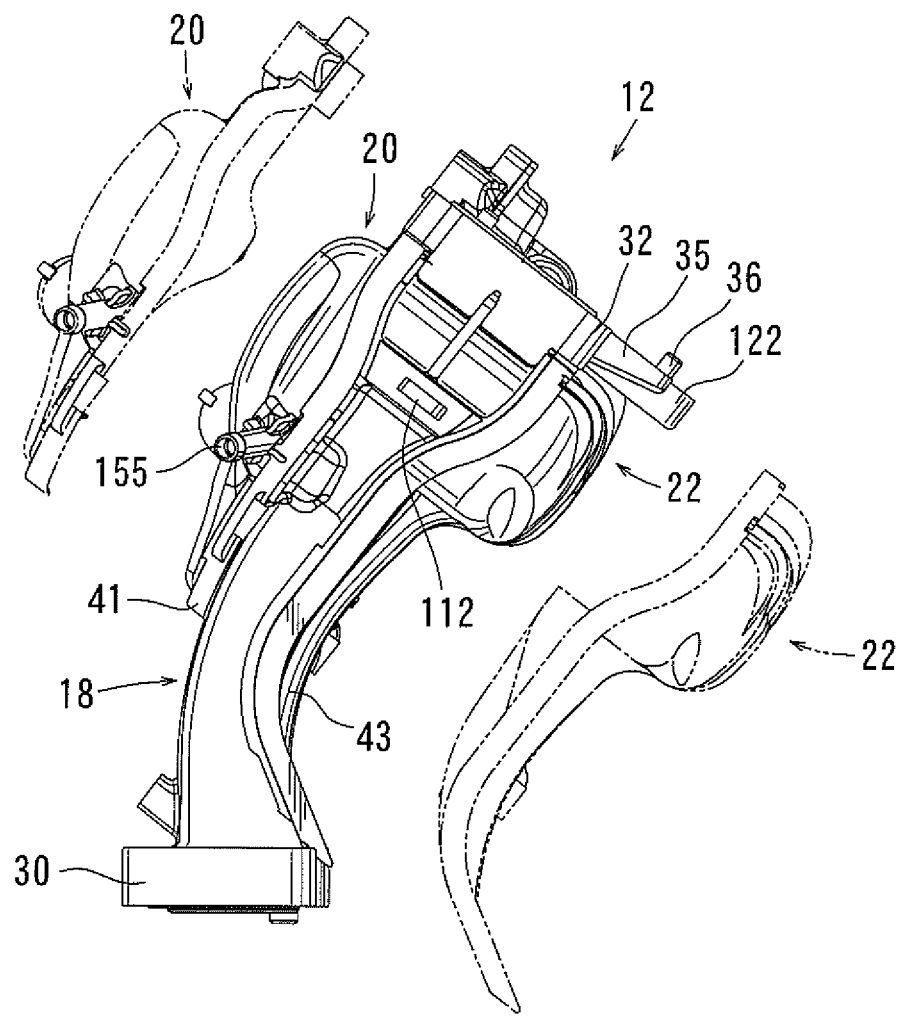
FIG. 9 is a right side view of the manifold body.
Figure 10:
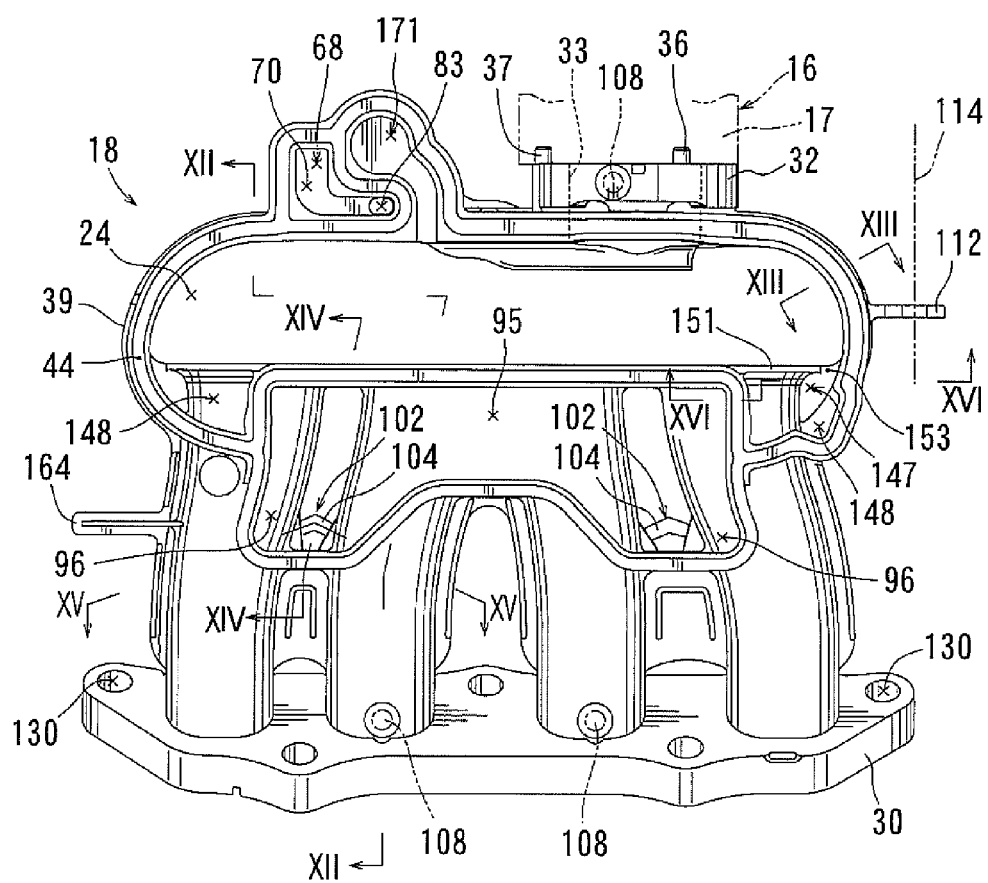
FIG. 10 is a front view of a first piece of the manifold body.
Figure 11:
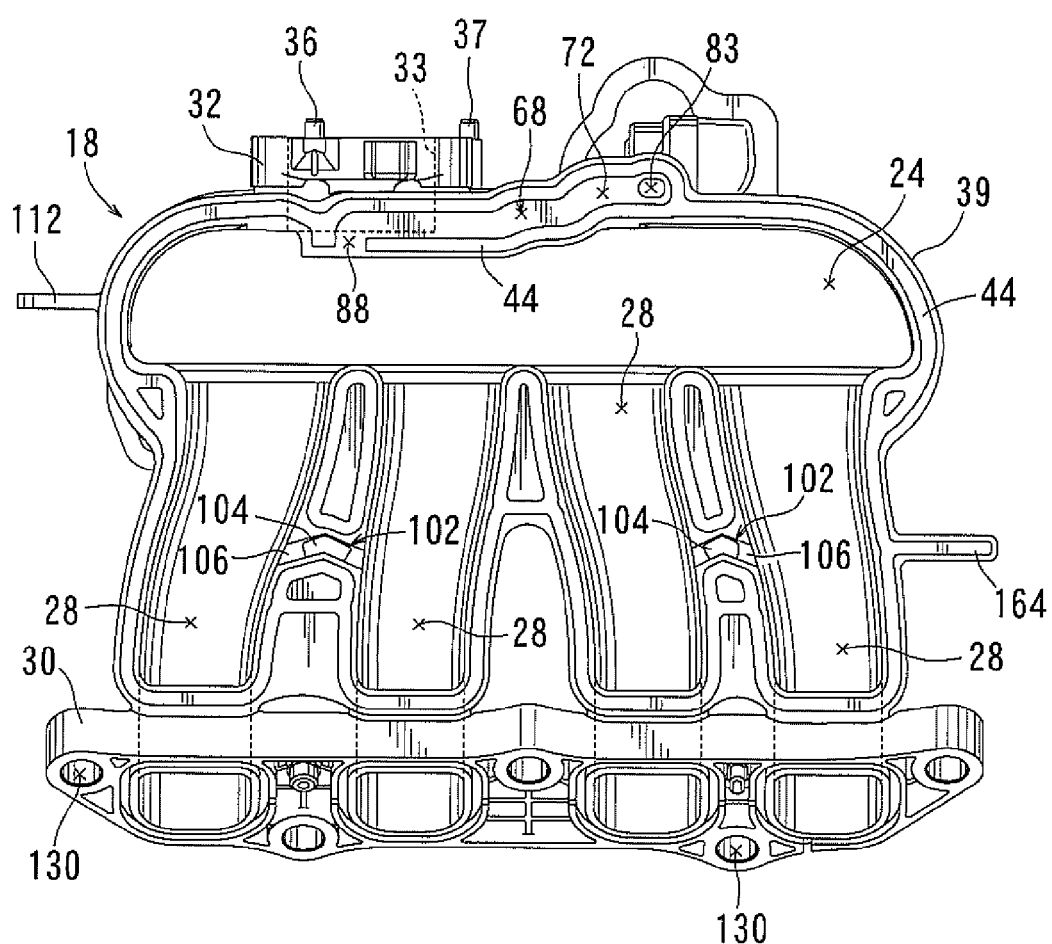
FIG. 11 is a rear view of the first piece.
Figure 19:
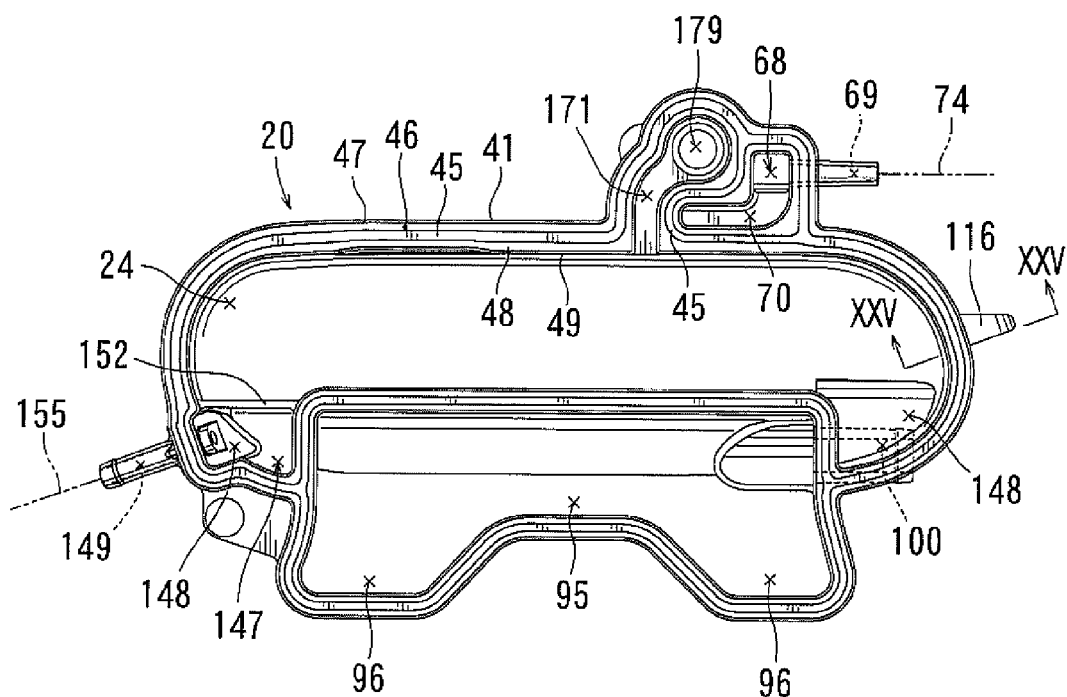
FIG. 19 is a rear view of a second piece of the manifold body.
Figure 20:
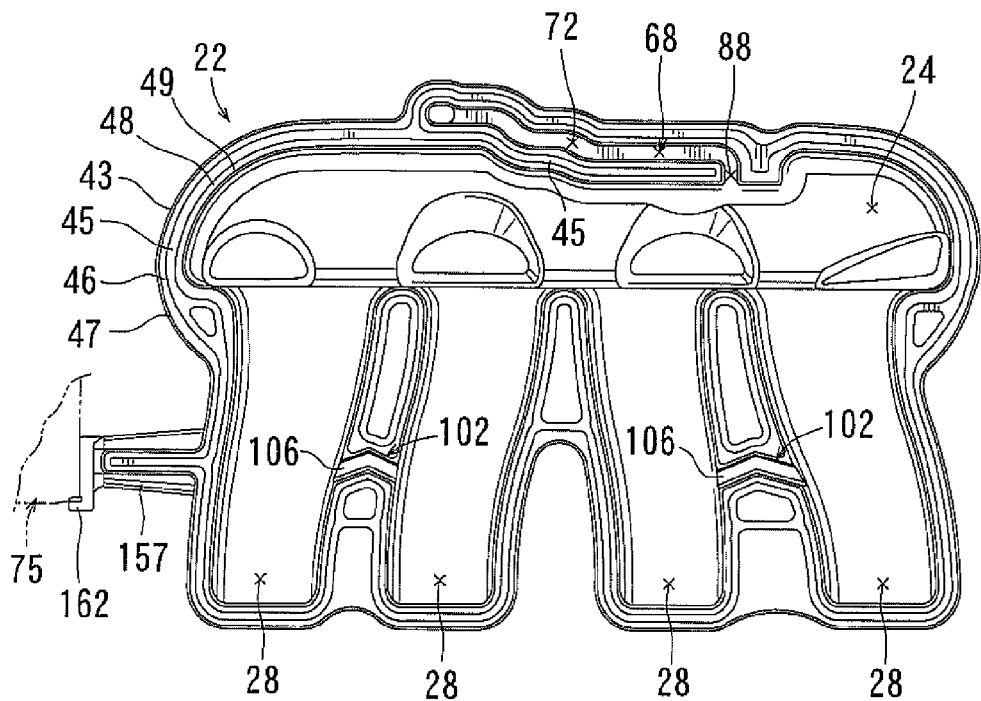
FIG. 20 is a front view of a third piece of the manifold body.

As shown in FIG. 9, the manifold body 12 includes three separate pieces arranged in forward and rearward directions (left and right directions in FIG. 9). As shown in FIGS. 8 and 9, the three separate pieces include a central first piece 18, a second piece 20 joined to the front side (left side in FIG. 9) of the first piece 18 by welding (e.g., vibration welding), and a third piece 22 joined to the rear side (right side in FIG. 9) of the first piece 18 also by welding (e.g., vibration welding). In FIGS. 8 and 9, the second and third pieces 20 and 22 before welding to the first piece 18 are indicated by chain lines. FIGS. 10 and 11 show a front view and a rear view of the first piece 18, respectively. FIG. 19 shows a rear view of the second piece 20 and FIG. 20 shows a front view of the third piece 22.

Figure 12:
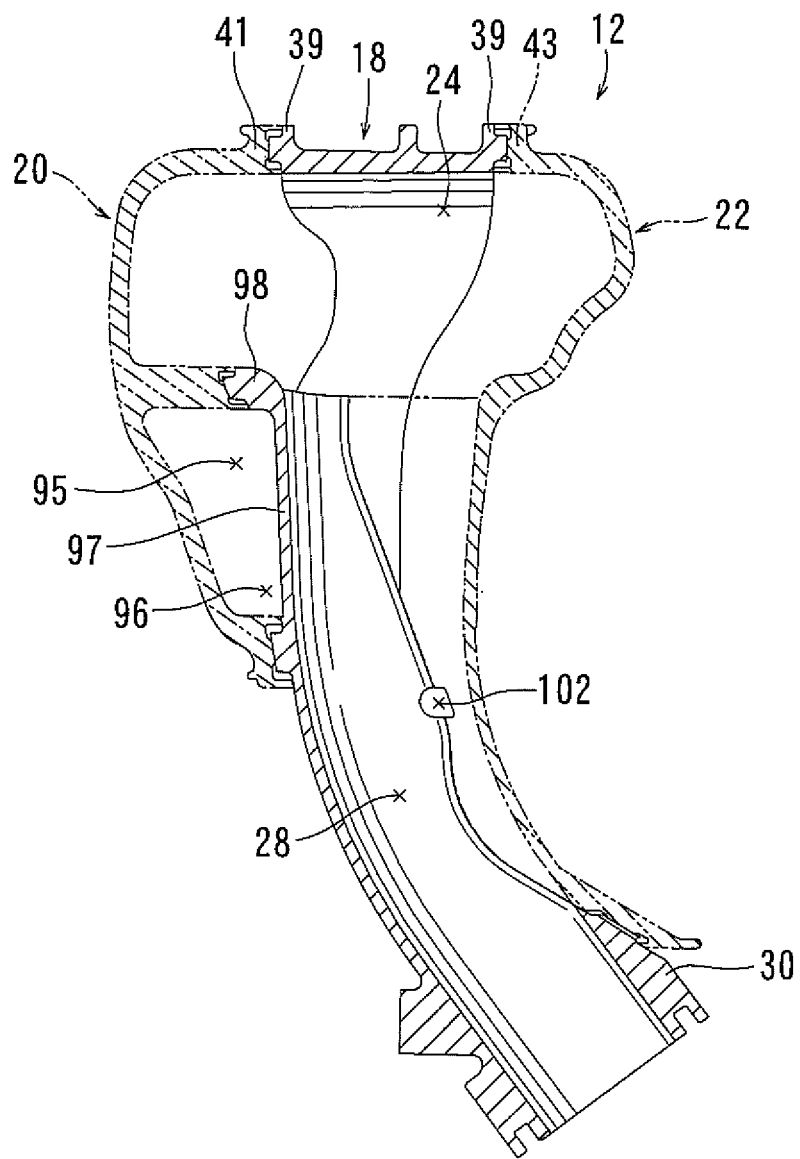
FIG. 12 is a cross sectional view taken along line XII-XII in FIG. 10.

Each of the first to third pieces 18, 20 and 22 is made of resin and may be molded, for example, by an injection molding process. The first piece 18 is a main component of the manifold body 12. The second piece 20 serves to cover the front side of the first piece 18. The third piece 22 serves to cover the rear side of the first piece 18. The first to third pieces 18, 20 and 22 jointly form a hollow surge tank chamber 24 within an upper side part of the manifold body 12 (see FIG. 12 showing a sectional view taken along line XII-XII in FIG. 10). The surge tank chamber 24 has a configuration elongated in the horizontal direction and serves to provide a volume of space for suppressing pulsation of the intake air. In FIGS. 10, 11, 19 and 20, space portions of the first to third pieces 18, 20 and 22 defining the surge tank chamber 24 are allocated the same reference numeral 24 as the surge tank chamber.

As shown in FIG. 10, a throttle mounting flange 32 defining therein an intake air introduction port 33 is formed on a right side part of an upper wall of the surge tank chamber 24 defined by the first piece 18. The throttle mounting flange 32 is shown in plan view in FIG. 26.

Figure 26:
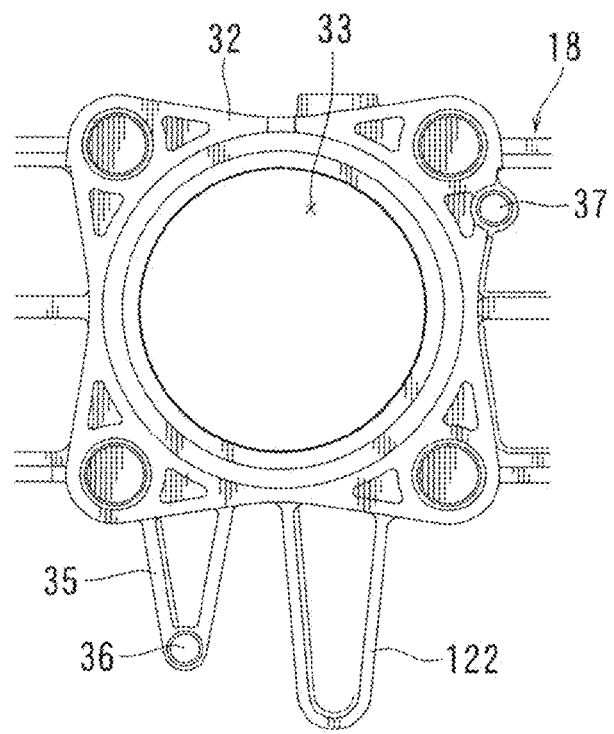
FIG. 26 is a plan view of a throttle mounting flange of the manifold body.

Referring to FIG. 26, a positioning stay 35 protrudes rearwardly (downwardly in FIG. 26) from the throttle mounting flange 32. Positioning pins 36 and 37 protrude from a rear end and an upper end of the positioning stay 35, respectively, and are spaced from each other by a predetermined angle in the circumferential direction of the throttle mounting flange 32.

Returning to FIG. 10, when a throttle body 17 of a throttle device 16 is mounted to the throttle mounting flange 32, the positioning pins 36 and 37 are fitted into corresponding fitting holes (not shown) formed in the throttle body 17, so that the throttle body 17 can be positioned relative to the throttle mounting flange 32. The throttle body 17 can be fixed to the throttle mounting flange 32 by means of a suitable fastening device, such as bolts (not shown). An air cleaner (not shown) may be mounted to the upstream side end portion of the throttle body 17, so that intake air flowing into the throttle body 17 via the air cleaner is introduced into the surge tank chamber 24 via the intake air introduction port 33. A throttle valve (not shown) is rotatably mounted within the throttle body 17 for opening and closing an intake air passage defined in the throttle valve 17, so that an amount of intake air supplied into the surge tank chamber 24 can be adjusted. The throttle body 17 may also include a cooling water pipeline (not shown), through which engine cooling water (hot water) can flow.

Figure 17:
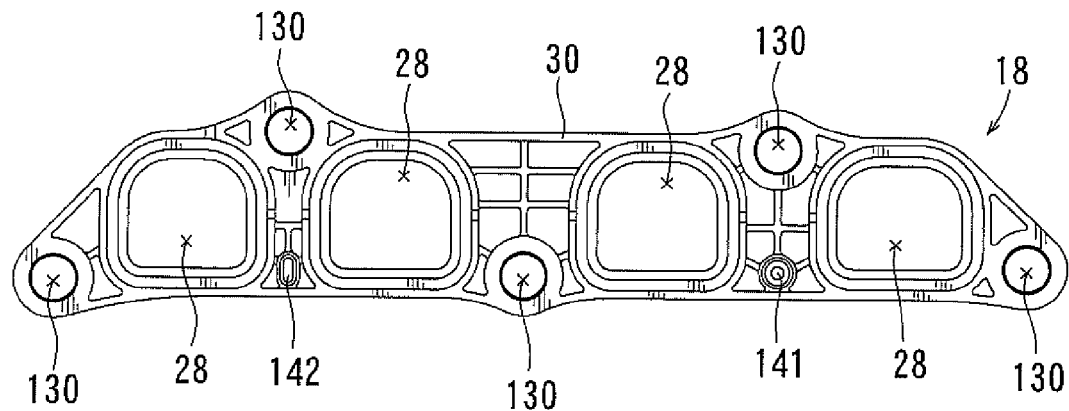
FIG. 17 is a view of a connection flange of the manifold body as viewed from its one end.

Referring to FIG. 12, four branch passages 28 branched from the surge tank chamber 24 are formed by joining the first piece 18 and the third piece 22 together. In FIGS. 11 and 20, portions or grooves of the first piece 18 and the third piece 22 jointly defining the branch passages 28 are labeled with the same reference numeral 28 as the branch passages. As shown in FIGS. 11 and 20, the branch passages 28 are arranged in left and light directions and in right and left pairs. As shown in FIG. 11, a horizontally elongated connection flange 30 is formed with the lower end portion of the first piece 18. The outlet ports of the branch passages 28 are opened at the lower end surface of the connection flange 30 (see FIG. 12). FIG. 17 shows the lower end surface of the connection flange 30.

Joint flanges 39, 41 and 43 are formed on the outer circumferential portions of the first, second and third pieces 18, 20 and 22, respectively (see FIGS. 10, 19 and 20), to provide joint surfaces for welding. The first piece 18 has two joint flanges 39 positioned on opposite sides. For joint flanges 39, 41 and 43, portions that are the same or correspond to each other are labeled with the same reference numerals.

Figure 13:
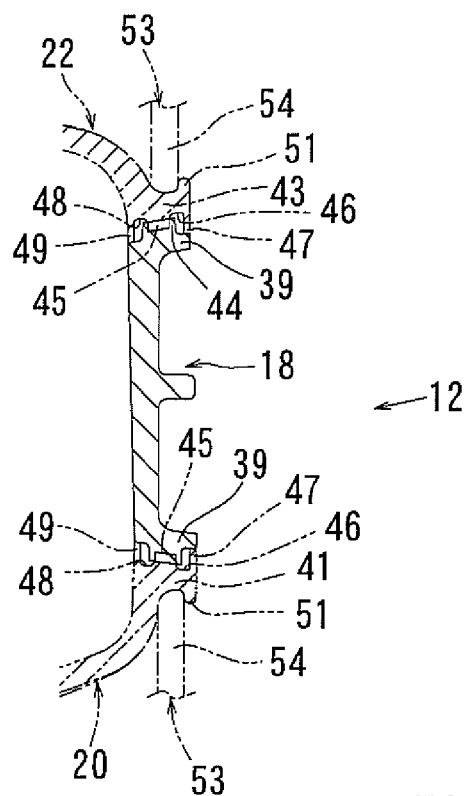
FIG. 13 is a cross sectional view taken along line XIII-XIII in FIG. 10.

As shown in FIG. 13 that is a sectional view taken along line XIII-XIII in FIG. 10, a pair of welding portions 44 configured as linear projections are formed on the joint surface of each of the joint flanges 39. A welding portion 45 configured as a linear projection, a burr hiding portion 47 configured as a linear projection disposed on the outer circumferential side of the welding portion 45 and spaced from the welding portion 45 by a groove 46, a burr hiding portion 49 configured as a linear projection disposed on the inner circumferential side of the welding portion 45 and spaced from the welding portion 45 by a groove 48 are formed on each of the joint flanges 41 and 43. A hook wall 51 is formed on the outer circumferential end of each of the joint flanges 41 and 43 at a position opposite to the joint surface. The welding portions 44 and 45 may be provided at any portions of the first, second and third pieces 18, 20 and 22 other than at the joint flanges 39, 41 and 43 if necessary or preferable for joining the first, second and third pieces 18, 20 and 22 together. Further, the outer groove 46 and the burr hiding portion 47 and/or the inner groove 47 and the burr hiding portion 49 also may be provided at any portions if necessary or preferable.

In order to weld the second piece 20 (or the third piece 22) to the first piece 18, the joint flange 41 (or 43) of the second piece 20 (or the third piece 22) is positioned on the joint flange 39 of the first piece 18. Then, a vibration welding device (not shown) is operated to join the joint flanges 39 and 41 (or 43) together by vibration welding, so that the joint flange 39 and the joint flange 41 (or 43) are welded together. More specifically, the second piece 20 (or the third piece 22) is positioned on the upper side of the first piece 18, and in this state, the first piece 18 and the second piece 20 (or the third piece 22) are pressed and held between an upper die and a lower die of the vibration welding device, and thereafter, vibrations are applied from the upper die to the second piece 20 (or the third piece 22). During the welding process, a hook portion 54 of a jig 53 provided at the upper die is hooked to the hook wall 51 of the second piece 20 (or the third piece 22). By joining the first piece 18, the second piece 20 and the third piece 22 together in this way, the manifold body 12 can be formed (see FIGS. 7 to 9).

Figure 18:
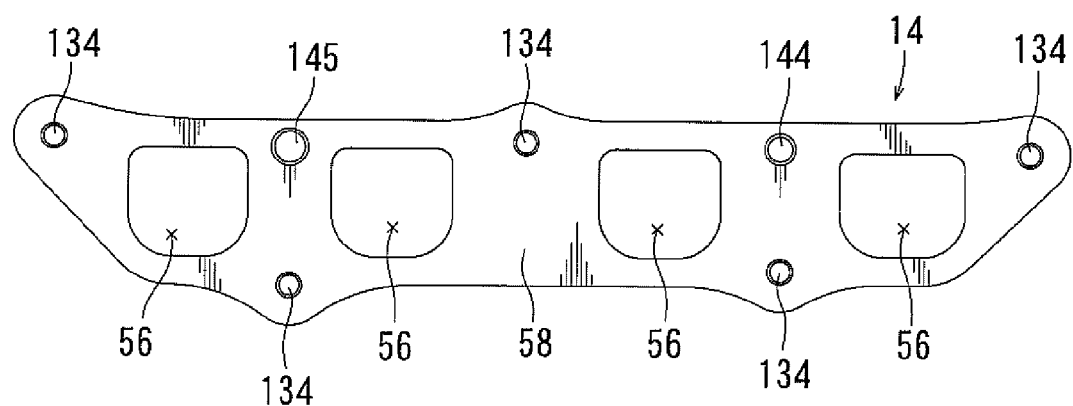
FIG. 18 is a view of an upstream side connection flange of a connection member of the intake manifold as viewed from its one end.

Returning to FIG. 1, the connection member 14 is made of metal and may be an aluminum die-cast product. The connection member 14 has four communication passages 56 formed therein and arranged in right and left directions. An upstream side connection flange 58 is formed with the upper end portion of the connection member 14. The connection flange 58 has openings defining inlet ports of the communication passages 56. The upstream side connection flange 58 is shown in FIG. 18 as viewed from the upper side.

As shown in FIG. 2, a downstream side connection flange 60 is formed with the lower end portion of the connection flange 14 and has openings defining outlet ports of the communication passages 56. The communication passages 56 are curved such that their outlet ports are oriented rearward (leftward as viewed in FIG. 2). A cover flange 62 is lapped with the connection flange 60 and joined thereto by means of bolts 63 with a gasket or the like (not shown) interleaved between the cover flange 62 and the connection flange 60. The cover flange 62 is made of metal and may be an aluminum die-cast product. Communication holes 64 are formed in the cover flange 62 for communication with the communication passages 56 (see FIG. 4).

As shown in FIG. 1, the upstream-side connection flange 58 of the connection member 14 is lapped with the connection flange 30 of the manifold body 12 and joined thereto by means of bolts with a gasket or the like (not shown) interleaved between the connection flange 58 and the connection flange 30, so that the communication passages 56 of the connection member 14 (see FIG. 18) communicate with the branch passages 28 of the manifold body 12 (see FIG. 17). Integrating the manifold body 12 with the connection member 14 in this way can constitute the intake manifold 10 (see FIGS. 1 to 4). The cover flange 62 of the connection member 14 (see FIG. 1) can be joined to an intake-side portion of an engine head or a cylinder head of an internal combustion engine (not shown) by means of bolts or the like. Therefore, intake air diverged into the branch passages 28 from the surge tank chamber 24 of the intake manifold body 12 may flow through the communication passages 56 of the connection member 14 and the communication ports 64 of the cover flange 64 (see FIG. 4) and may further flow into combustion chambers of cylinders of the engine via intake air ports provided in a cylinder head of the engine. The fastening structure for fastening the connection flange 30 of the manifold body 12 and the upstream side connection flange 58 of the connection member 14 together will be described later.

The details of various parts of the manifold body 12 of the intake manifold 10 will now be described.

Purge Gas Passage

A purge gas passage 68 is formed in the manifold body 12 for introduction of purge gas desorbed from a canister 76 (see FIG. 7) into the surge tank chamber 24 (see FIGS. 10, 11, 19 and 20). Thus, the purge gas passage 68 serves as a communication passage for communication between the canister 76 and the surge tank chamber 24. The purge gas passage 68 is defined when the first, second and third pieces 18, 20 ad 22 are joined together. More specifically, the purge gas passage 68 includes a purge gas introduction port 69 defined in the second piece 20 (see FIG. 19), an upstream side passage portion 70 defined by the first piece 18 and the second piece 20 when the first and the second pieces 18 and 20 are joined to each other (see FIGS. 10 and 19), and a downstream side passage portion 72 defined by the first piece 18 and the third piece 22 when the first and the third pieces 18 and 22 are joined to each other (see FIGS. 11 and 20). The upstream side passage portion 70 of the purge gas passage 68 is shown in an exploded perspective view of FIG. 21, and the downstream side passage portion 72 of the purge gas passage 68 is shown in an exploded perspective view of FIG. 22.

Figure 7:
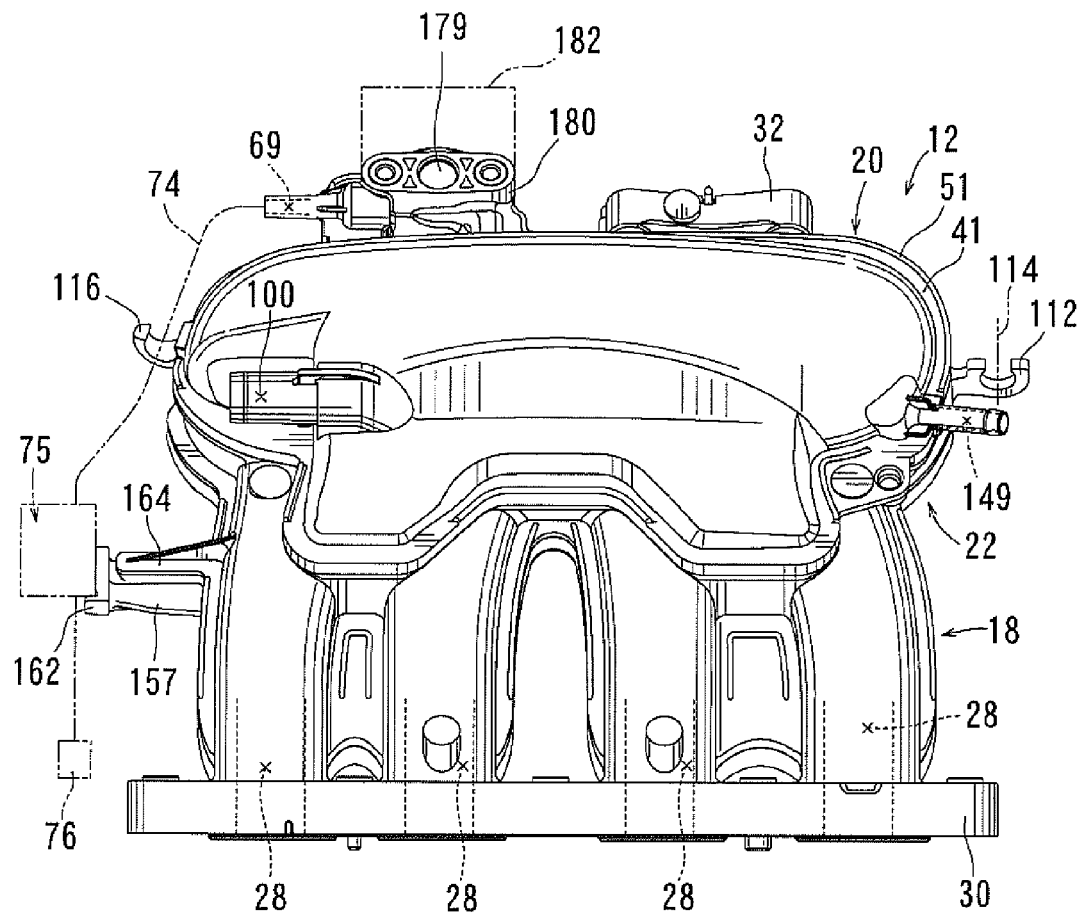
FIG. 7 is a front view of a manifold body of the intake manifold.

As shown in FIG. 7, the purge gas introduction port 69 is formed such that its open end is oriented leftward from the upper end portion of the second piece 20. A downstream side end of a purge gas hose 74 made, for example, of rubber, is connected to the purge gas introduction port 69, so that purge gas discharged from a purge port of the canister 76 may flow into the purge gas introduction port 69 through the purge gas hose 74. A purge control valve 75 is provided in the midway of the purge gas hose 74 for controlling the flow rate of the purge gas. The purge control valve 75 may be an electromagnetic flow control valve. The canister 76 can adsorb fuel vapor produced within a fuel tank (not shown). Fuel vapor may be desorbed from the canister 76 so as to be discharged as purge gas during the operation of the engine.

Figure 21:
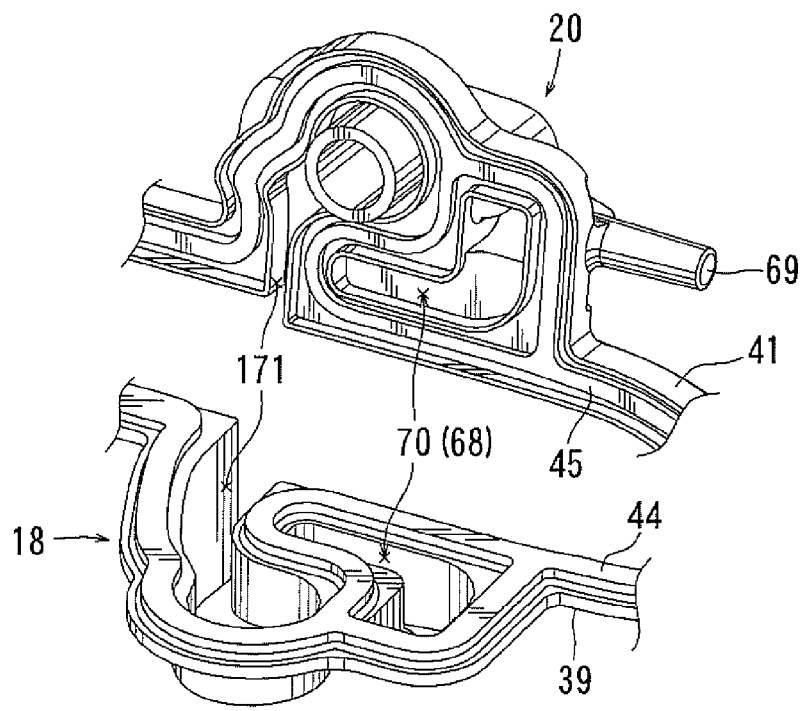
FIG. 21 is an exploded perspective view showing an upstream side passage portion of a purge gas passage of the manifold body.

As shown in FIG. 21, the upstream side passage portion 70 is formed by L-shaped grooves formed along the joint surfaces (i.e., the boundary plane between the first piece 18 and the second piece 20) at the upper portions of the first piece 18 and the second piece 20. The L-shaped grooves jointly form the upstream side passage portion 72 in an L-shaped form when the first and second pieces 18 and 20 are joined to each other. In FIG. 21, the L-shaped grooves are labeled with the same reference numeral 70 as the upstream side passage portion.

The upper end or the upstream side end of the upstream side passage portion 70 communicates with the purge gas introduction port 69. A communication hole 83 is formed at the lower right end or the downstream side end of the upstream side passage portion 70 and extends therethrough in the forward and rearward directions (see FIG. 10). The welding portions 44 and 45 of the first and second pieces 18 and 20 are configured to surround the upstream side passage portion 70 (see FIGS. 10, 19 and 21).

Figure 22:
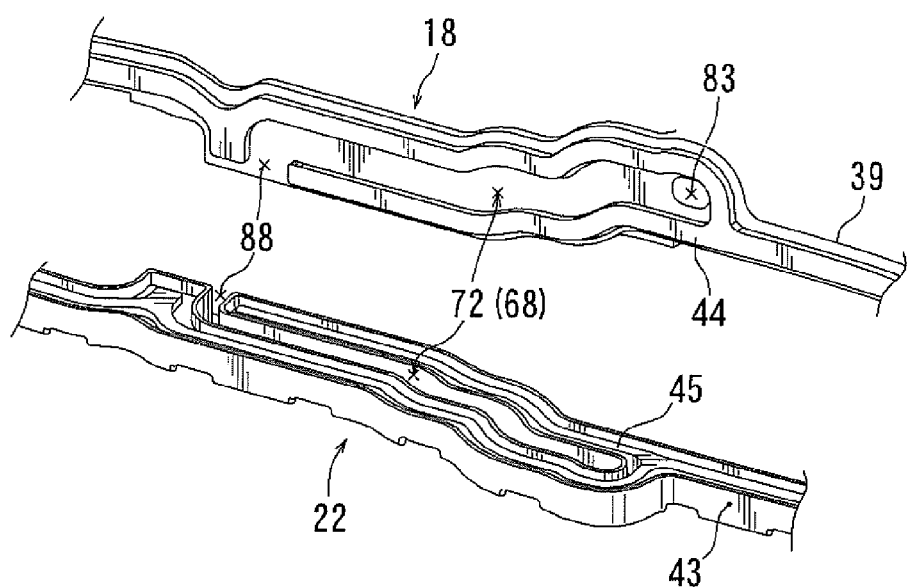
FIG. 22 is an exploded perspective view showing a downstream side passage portion of the purge gas passage.

As shown in FIG. 22, the downstream side passage portion 72 is formed by horizontally elongated grooves formed along the joint surfaces (i.e., the boundary plane between the first piece 18 and the third piece 22) at the upper portions of the first piece 18 and the third piece 22. The elongated grooves jointly form the downstream side passage portion 72 in an elongated form when the first and third pieces 18 and 22 are joined to each other. In FIG. 22, the elongated grooves are labeled with the same reference numeral 72 as the downstream side passage portion.

The left end (right end as viewed in FIG. 11) or the upstream side end of the downstream side passage portion 72 communicates with the communication hole 83. The right end or the downstream side end of the downstream side passage portion 72 (more specifically, the right end (left end as viewed in FIG. 11) of the elongated groove defining the downstream side passage portion 72 of the first piece 18 and the right end as viewed in FIG. 20 of the elongated groove defining the downstream side passage portion 72 of the third piece 22) communicates with the surge tank chamber 24 via a downwardly oriented outlet port 88. The welding portions 44 and 45 of the first and third pieces 18 and 22 are configured to surround the downstream side passage portion 72 except for the outlet port 88 (see FIGS. 11, 20 and 22). The outlet port 88 is positioned proximal to the rear side (front side of the sheet of FIG. 11) of the intake air introduction port 33. The purge gas flown into the surge tank chamber 24 from the outlet port 88 may be mixed with intake air within the surge tank chamber 24, and a mixture of purge gas and air is then distributed into the branch passages 28.

In this way, side walls defining therebetween the upstream side passage portion 70 and the downstream side passage portion 72 of the purge gas passage 68 (i.e., the upper wall of the surge tank chamber 24) serve as side walls including the separating surface (i.e., the boundary plane) of the surge tank chamber 24 between the first and second pieces 18 and 20 welded to each other and between the first and third pieces 18 and 22 also welded to each other. In addition, the upper wall of the surge tank chamber 24 includes double wall structures for the passage portions 70 and 72 of the purge gas passage 68 communicating with the surge tank chamber 24. Each of the double wall structures includes an inner wall on the inner side of the passage portion (or a lower wall on the lower side of the passage portion) and an outer wall on the outer side of the passage portion (or an upper wall on the upper side of the passage portion) defining the passage portion 70 (or 72) therebetween. In addition, the inner walls of the passage portions 70 and 72 are welded to each other and the outer walls of the passage portions 70 and 72 are welded to each other.

Thus, the side walls including the separating surfaces (i.e., the boundary planes) of the surge tank chamber 24 between the first and second pieces 18 and 20 joined to each other and between the first and third pieces 18 and 22 also joined to each other are provided with double wall structures each including the inner wall and the outer wall defining the passage portion 70 (or 72) of the purge gas passage 68 communicating with the surge tank chamber 24. Because the double wall structures are provided at the side walls (the upper wall) of the surge tank chamber 24, it is possible to improve the pressure resisting strength of the side walls. In addition, spaces provided by the double wall structures are used to form the passage portions 70 and 72.

Further, the inner walls of the passage portions 70 and 72 are welded to each other and the outer walls of the passage portions 70 and 72 are welded to each other. Therefore, the side walls (upper wall) of the surge tank chamber 24 including the separating surfaces (i.e., the boundary planes) have a double welded structure, so that it is possible to further improve the pressure resisting strength of the side walls.

Furthermore, as described previously, the outlet port 88 of the purge gas passage 68 is positioned proximal to the intake air introduction port 33 of the surge tank chamber 24 (see FIG. 11). Although the outlet port 88 is proximal to the rear side of the intake air introduction port 33 in this example, the outlet port 88 may be proximal to any side of the intake air introduction or may be positioned in any other position as long as the purge gas discharged from the outlet port 88 may not be influenced by the flow of the intake air flowing from the intake air introduction port 33. This arrangement may enhance the mixing operation of the intake air and the purge gas in comparison with the arrangement where the outlet port 88 is positioned away from the intake air introduction port 33. Therefore, it is possible to equalize the amount of purge gas distributed from the surge tank chamber 24 into the branch passages 28. This is particularly advantageous in the case that the distances between the intake air introduction port 33 and the inlets of the branch passages 28 are short and no main stream of intake air is produced or is difficult to be produced.

Reinforcing Ribs

As shown in FIG. 4, a plurality of reinforcing ribs 92 are formed on the outer surface of the third piece 22 defining the upper portion of the rear wall of the surge tank chamber 24. The reinforcing ribs 92 are spaced from each other in the right and left directions as viewed in FIG. 4. Two of the reinforcing ribs 92 positioned at the leftmost and rightmost positions are inclined such that their lower portions are oriented toward each other. One of the reinforcing ribs 92 is shown in a perspective view and a sectional view in FIGS. 23 and 24, respectively.

Figure 23:
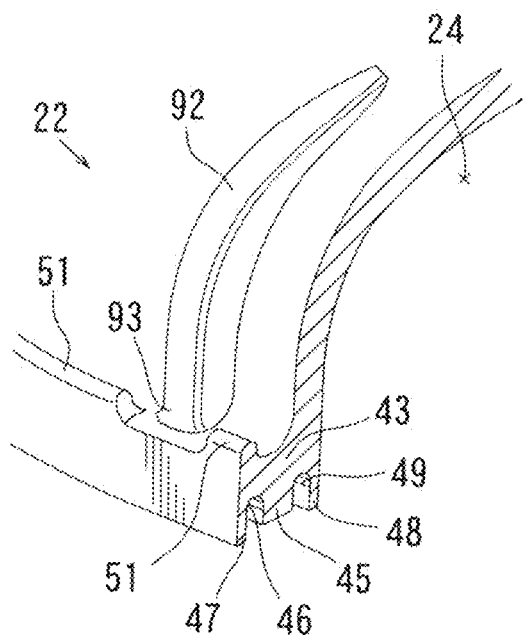
FIG. 23 is a perspective view showing one of reinforcing ribs of the manifold body.
Figure 24:
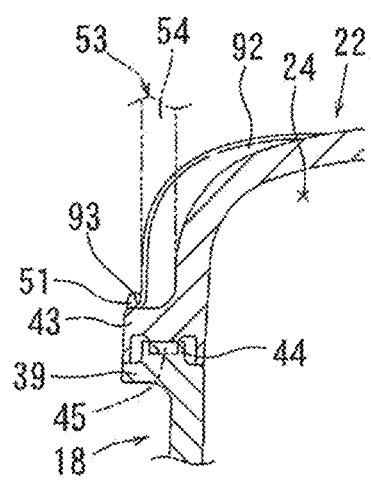
FIG. 24 is a sectional view of the reinforcing rib.

As shown in FIG. 23, the reinforcing rib 92 is configured in a form of a curved elongated plate extending in a vertical direction and has a lower end portion (an end portion on the side of the joint flange 43) intersecting with the joint flange 43. The hook wall 51 of the third piece 22 extends like a linear projection but is interrupted at positions of the reinforcing ribs 92. Therefore, the hook wall 51 is separated into a plurality of hook wall portions and the lower ends of the reinforcing ribs 92 are positioned between the hook wall portions.

Thus, the reinforcing ribs 92 formed on the outer surface of the third piece 22 intersects with the joint flange 43 provided at the third piece 22 for the purpose of welding, and additionally, the hook wall 51 formed with the joint flange 43 for hooking the hook portion 54 of the welding jig 54 (see FIG. 24) is interrupted at positions of the reinforcing ribs 92 (see FIG. 23). Therefore, the hook wall 51 is formed separately from the reinforcing ribs 92. This arrangement allows providing an inclined surface 93 with a large radius of curvature at the base end of each reinforcing ribs 92 on the side of the joint flange 43 (see FIG. 23). Hence, it is possible to prevent concentration of stress at the base ends of the reinforcing ribs 92. In the case that the reinforcing ribs 92 are formed in series with the hook wall 51, only a small radius of curvature can be given to an inclination surface of the base end of each rib because of a design of a molding die, and it is liable to cause concentration of stress at the base end. Separating the hook wall 51 into a plurality of hook wall portions as in the above example enables to prevent concentration of stress at the base end of each rib 92.

Gas Tank Chamber

Figure 14:
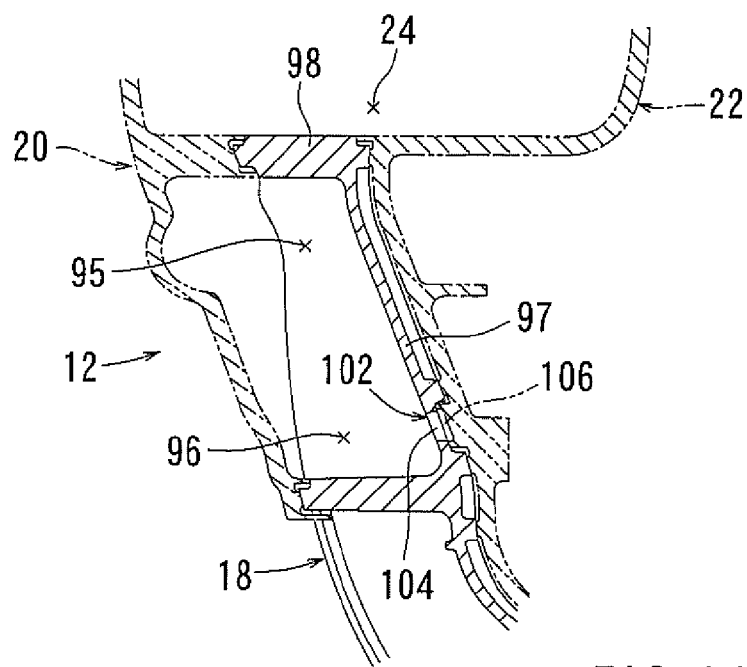
FIG. 14 is a cross sectional view taken along line XIV-XIV in FIG. 10.
Figure 15:
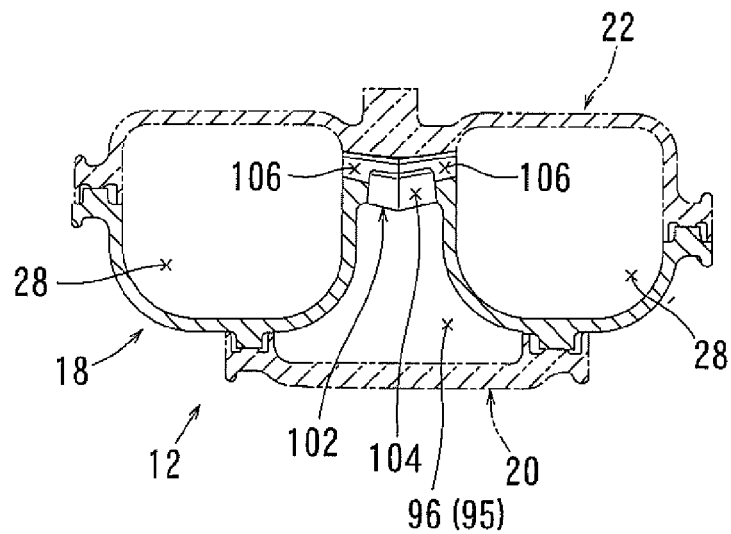
FIG. 15 is a cross sectional view taken along line XV-XV in FIG. 10.

As shown in FIG. 12, a gas tank chamber 95 is formed within the front portion of the manifold body 12 at the time when the first piece 18 and the second piece 20 are joined together. The gas tank chamber 95 serves as a volume of space for mixing blow-by gas. In FIGS. 10 and 19, portions or grooves of the first piece 18 and the second piece 20 jointly defining the gas tank chamber 95 are labeled with the same reference numeral 95 as the gas tank chamber. FIGS. 14 and 15 show cross sectional views taken along lines XIV-XIV and XV-XV in FIG. 10, respectively. As shown in these figures, the gas tank chamber 95 has a configuration elongated in the horizontal direction and has a pair of downwardly extending enlarged portions 96 disposed on its right and left ends (see FIGS. 10 and 19).

Referring to FIGS. 11 and 12, a wall part of the first piece 18 defining the branch passages 28 is integrated with a wall part of the first piece 18 defining the gas tank chamber 95. More specifically, the gas tank chamber 95 and the upper portions of the branch passages 28 are positioned adjacent each other in the forward and rearward directions with an intervention of a wall part 97 (see FIG. 12). The wall part 97 serves to define a part of the branch passages 28 and also serves to define a part of the gas tank chamber 95 (see also FIGS. 12 and 14). In addition, the surge tank chamber 24 and the gas tank chamber 95 are positioned adjacent each other in the vertical direction with an intervention of a partition wall 98 that is formed at the time when the first piece 18 and the second piece 20 are joined to each other (see FIGS. 12 and 14).

As shown in FIG. 8, a blow-by gas introduction port 100 is formed in the left side portion of the second piece 20 and has an open end oriented leftward (rightward as viewed in FIG. 19). A downstream side end of a blow-by gas pipeline of a PVC system (not shown) for refluxing blow-by gas from a crank case (not shown) of the engine into the intake air passage can be connected to the blow-by gas introduction port 100, so that the blow-by gas can be introduced into the gas tank chamber 95 via the blow-by gas introduction port 100.

As shown in FIG. 10, the lower end of the enlarged portion 96 positioned on the left side of the gas tank chamber 95 communicates with the left side pair of the branch passages 28 at their central portions with respect to the direction of flow of intake air through the branch passages 28 (the vertical direction as viewed in FIG. 12) via a gas distribution passage 102 positioned on the left side (see FIG. 15). Similarly, the lower end of the enlarged portion 96 positioned on the right side of the gas tank chamber 95 communicates with the right side pair of the branch passages 28 at their central portions with respect to the direction of flow of intake air through the branch passages 28 via a gas distribution passage 102 positioned on the right side.

Each of the gas distribution passages 102 includes a horizontally elongated communication hole portion 104 and a branch passage portion 106 (see FIG. 14). The communication hole portion 104 is formed in a wall part defining the lower portion of the enlarged portion 96 and extends therethrough in the forward and rearward directions. The branch passage portion 106 extends in right and left directions and is formed between the first piece 18 and the third piece 22 when the first piece 18 and the third piece 22 are joined to each other. In FIGS. 11 and 20, portions or grooves of the first piece 18 and the third piece 22 jointly defining the branch passage portion 106 are labeled with the same reference numeral 106 as the branch passage portion.

As shown in FIG. 11, the communication hole portion 104 communicates with the central portion with respect to the right and left directions of the branch passage portion 106. Opposite ends of the branch passage portion 106 communicate with the central portions with respect to the vertical direction of the corresponding right or left pair of branch passages 28 (see FIGS. 12, 15 and 20). Each of the communication hole portion 104 and the branch passage portion 106 is configured to have a substantially inverted V-shape so as to be inclined downwardly from the central portion with respect to the right and left directions toward the opposite ends (see FIGS. 10 and 11). In addition, the branch passage portion 106 is also configured to have a substantially inverted V-shaped so as to be inclined rearwardly from the central portion with respect to the right and left directions toward the opposite ends (see FIGS. 11 and 20).

With the above arrangement, blow-by gas flows from the blow-by gas introduction port 100 into the gas tank chamber 95, where the blow-by gas is mixed to have a uniform distribution ratio. Thereafter, the blow-by gas is distributed into the branch passages 28 via the corresponding gas distribution passages 102 each having the communication hole portion 104 and the branch passage portion 106. Therefore, the blow-by gas introduced into the gas tank chamber 95 and mixed to have a uniform distribution ratio is distributed directly into the branch passages 28 without flowing through the surge tank chamber 24. Hence, it is possible to equalize the distribution of gas into the branch passages 28. In addition, because the blow-by gas dose not flow through the surge tank chamber 24, the blow-by gas does not affect the turbulent flow that may be produced within the surge tank 24. This may further ensure equalization of distribution of gas into the branch passages 28. Although the blow-by gas is introduced into the gas tank chamber 95 for refluxing into the engine in this embodiment, the blow-by gas may be replaced with any gas, such as purge gas and EGR gas, which is refluxed into the engine.

The wall part defining the branch passages 28 and the wall part defining the gas tank chamber 95 are integrated with each other, and the gas tank chamber 95 and the upper portions of the branch passages 28 are positioned proximal to each other in the forward and rearward directions with the intervention of the wall 97 (see FIGS. 12, 14 and 15). Therefore, in comparison with the arrangement where the wall defining the branch passages 28 and the wall defining the gas tank chamber 95 are formed separately from each other, it is possible to improve the rigidity of the intake manifold 10 and to downsize the intake manifold 10.

Further, the surge tank chamber 24 and the gas tank chamber 95 are positioned proximal to each other with the intervention of the partition wall 98 (see FIGS. 12 and 14). Therefore, in comparison with the arrangement where the surge tank chamber 24 and the gas tank chamber 95 are positioned away from each other, it is possible to improve the rigidity of the intake manifold 10 and to downsize the intake manifold 10.

Furthermore, the branch passage portion 106 of each of the gas distribution passages 102 is configured to have a substantially inverted V-shape so as to be inclined downwardly from the central portion with respect to the right and left directions toward the opposite ends (see FIGS. 11 and 20). Therefore, the blow-by gas flowing through the branch passage portion 106 can smoothly converge with the intake air flowing through the corresponding branch passages 28. It is also possible to prevent backflow of the intake air from the branch passages 28 into the branch passage portion 106.

Injection Gates for Resin-Molding of First Piece

As shown in FIG. 10, three injection gates 108 are set for resin-molding the first piece 18 and include two gates 108 positioned at the lower end portions of the front walls of two branch passages 26 positioned centrally, and one gate 108 positioned centrally of the front portion of the throttle mounting flange 32. Timings of injecting molten resin from the injection gates 108 are controlled such that weld portions of the molten resin charged from the injection gates 108 are formed at positions downwardly away from the surge tank chamber 24 and the gas tank chamber 95.

With this arrangement, because one of the injection gates 108 is set at the throttle mounting flange 32 that is a part performing one of important functions of the intake manifold 10, it is possible to accurately mold the throttle mounting flange 32. In addition, weld portions are formed at positions downwardly away from the surge tank chamber 24 and the gas tank chamber 95, it is possible to avoid formation of the weld portions at an annular wall surrounding the surge tank chamber 24, which is liable to cause concentration of stress, and therefore, it is possible to improve the strength of the annular wall and to prevent defective molding of the annular wall. Further, because it is possible to avoid formation of the weld portions at the welding portions 44 between the surge tank 24 and the gas tank chamber 95, defective welding (defecting joint) between the first piece 18 and the second piece 20 (or the third piece 22) can be avoided.

Hose Clamps

As shown in FIG. 10, a C-shaped hose clamp 112 having a front opening is formed integrally with an outer surface of the right side wall portion of the surge tank chamber 24 of the first piece 18 (see also FIG. 7). A hot water hose 114 can be resiliently fitted into the hose clamp 112 so as to be held by the hose clamp 112. The hot water hose 114 may be made of rubber and communicates between a cooling water pipeline of the throttle body 17 of the throttle device 16 and a cooling water pipeline of the engine. The hose clamp 112 can be formed simultaneously with resin-molding the first piece 18 by vertically (as viewed in FIG. 10) slidably moving a slidable die part of a molding die that is used for molding the first piece 18.

As shown in FIG. 7, another C-shaped hose clamp 116 having a front opening is formed integrally with the outer surface of the left side wall portion of the surge tank 24 of the second piece 20. The purge gas hose 74 communicating between the purge gas introduction port 69 and the purge control valve 75 can be resiliently fitted into the hose clamp 116 so as to be held by the hose clamp 116. See also FIG. 25 that is a cross sectional view taken along line XXV-XXV in FIG. 19.

Figure 25:
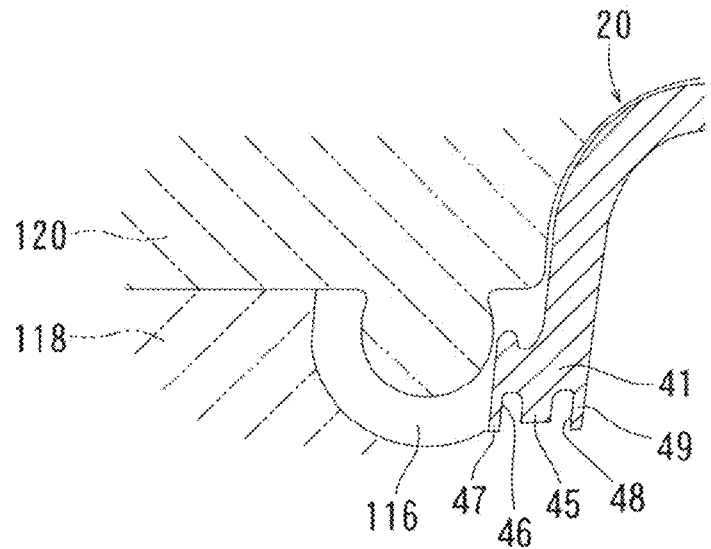
FIG. 25 is a cross sectional view taken along line XXV-XXV in FIG. 19.

A molding die (not shown) for resin-molding the second piece 20 may have slidable die parts that can mold the purge gas introduction port 69 and the blow-by gas introduction port 100. Therefore, because of the structural problem of the molding die, it is difficult to mold the hose clamp 116 by using a slidable die part that slides in a direction intersecting with the sliding directions (right and left directions as viewed in FIG. 19) of the die parts used for molding the purge gas introduction port 69 and the blow-by gas introduction port 100. For this reason, in this example, as shown in FIG. 25, the hose clamp 116 is molded by a stationary die part 118 used for molding the rear side portion (lower side portion as viewed in FIG. 25) of the second piece 20 and a movable die part 120 used for molding the front side portion (upper side portion as viewed in FIG. 25) of the second piece 20. Thus, although the hose clamp 116 has an undercut configuration with respect to the movable die part 120, according to this arrangement, the hose clamp 116 is forcibly removed from the movable die 120 during a die stripping process. Therefore, it is possible to easily mold the hose clamp 116 without using a slidably die part.

Positioning Stay Protecting Structure

As shown in FIG. 26, a leg 122 is formed on the throttle mounting flange 32 and extends rearwardly (downwardly as viewed in FIG. 26) therefrom and in parallel to the positioning stay 35. The protruding height (downward protruding length) of the leg 122 from the throttle mounting flange 32 is set to be higher than the protruding height of the positioning stay 35. In addition, the rigidity of the leg 122 is configured to have a rigidity that is higher than that of the stay 35.

Generally, in a production line of intake manifolds, intake manifolds are placed on carriers provided in the production line before the mounting operation of the throttle valves. The intake manifold 10 (see FIGS. 1 to 4) placed on one of carriers 124 of the production line is shown in a right side view in FIG. 27.

Figure 27:
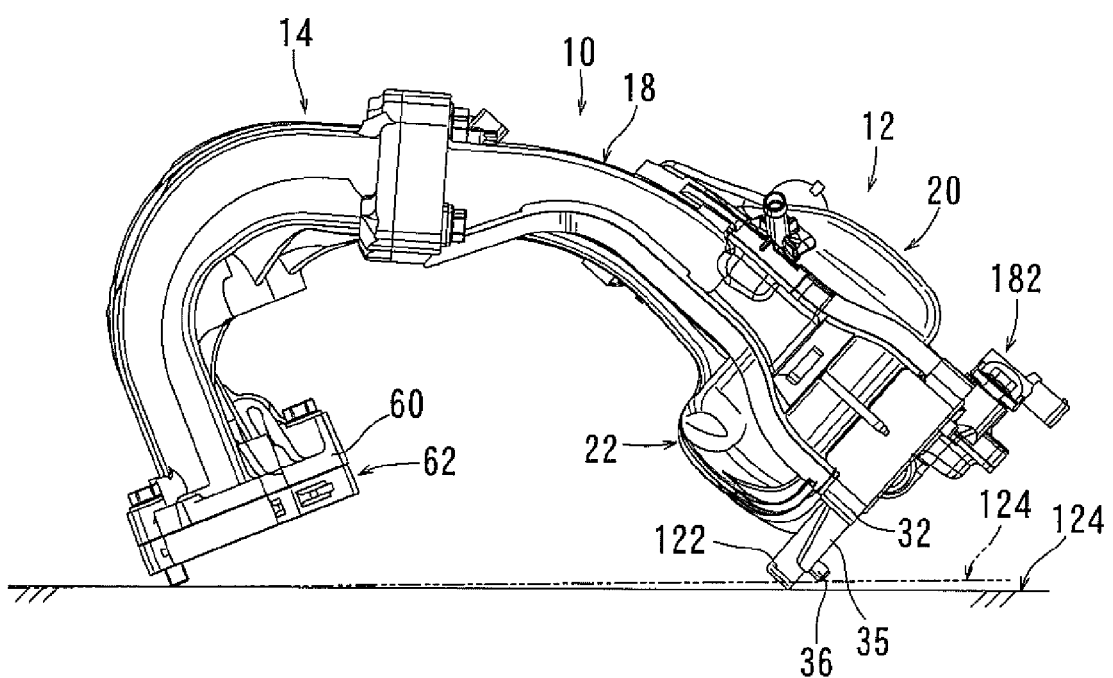
FIG. 27 is a right side view showing the state where the intake manifold is placed on a carrier.

As shown in FIG. 27, the intake manifold 10 generally has a curved configuration, and therefore, the intake manifold 10 may be placed in stable on the carrier 124 when the side of the third piece 22 is oriented downward rather than when the side of the second piece 20 is oriented downward. In such a case, the leading end of the leg 122 is positioned at the lowest position and contacts the upper surface of the carrier 124. Therefore, the positioning pin 36 of the positioning stay 35 can be spaced from the upper surface of the carrier 124, so that the positioning stay 35 and/or the positioning pin 36 can be protected not to cause deformation or not to be damaged. As a result, it is possible to prevent improper assembling of the throttle body 17 with the throttle mounting flange 32.

If the intake manifold 10 does not have the leg 122, the leading end of the positioning pin 36 of the positioning stay 35 is positioned at the lowest position and contacts the upper surface of the carrier 124 (see chain lines in FIG. 27). Therefore, when an external force is applied to downwardly press the intake manifold 10, it may be possible that the positioning stay 35 (and/or positioning pin 36) is deformed or damaged. This may eventually lead to improper assembling of the throttle body 17 with the throttle mounting flange 32.

In the case of the above example, this problem may not be caused because the positioning stay 35 (and/or the positioning pin 36) is protected by the leg 122.

EGR Gas Distribution Passage

As shown in FIG. 2, an EGR gas introduction port 126 is formed integrally with the left end portion of the connection flange 60 on the downstream side of the connection member 14. A downstream side end of an EGR gas pipeline (not shown) for introducing EGR (exhaust gas recirculation) gas can be connected to the EGR gas introduction port 126 by means of bolts or any other suitable fastening means. An EGR valve (not shown) that may be an electromagnetic control valve is provided in the EGR gas pipeline for controlling the amount of the EGR gas. An EGR gas distribution passage 128 (see FIG. 4) is formed between the joint surfaces of the downstream side connection flange 60 and the cover flange 62 and connects between the EGR gas introduction port 126 and the communication passages 56, so that the EGR gas introduced into the EGR gas introduction port 126 is distributed into the communication passages 56 via the EGR gas distribution passage 128.

With the above arrangement, the EGR gas distribution passage 128 is formed by joining the downstream side connection flange 60 of the connection member 14 and the cover flange 62 together. Therefore, in comparison with the case where the EGR gas distribution passage 128 is formed by a separate dedicated part, it is possible to reduce the number of assembling steps and the number of parts and to eventually reduce the manufacturing cost. Although the EGR gas is introduced into the communication passages 56, it is possible to introduce the EGR gas into the surge tank chamber 24 or the branch passages 28.

Structure for Fastening Manifold Body and Connection Member Together

As shown in FIG. 17, a plurality of collar mounting holes 130 (five in this example) are formed in the connection flange 30 of the first piece 18. Two of the collar mounting holes 130 are positioned at the opposite ends of the connection flange 30. The other three of the collar mounting holes 130 are each positioned between the openings of two adjacent branch passages 28 and include one positioned centrally of the connection flange 30. The two collar mounting holes 130 positioned at the opposite ends of the connection flange 30 and the one positioned centrally of the connection flange 30 are formed in the rear portion (lower portion as viewed in FIG. 17) of the connection flange 30. The remaining two collar mounting holes 130 positioned between the opposite ends and central portion of the connecting flange 30 are formed in the front portion (upper portion as viewed in FIG. 17) of the connection flange 30.

As shown in FIG. 18, a plurality of threaded holes 134 (five in this example) are formed in the upstream side connection flange 58 of the connection member 14 by tapping processes. The threaded holes 134 are positioned to correspond to the collar mounting holes 130 and are each positioned coaxially with the corresponding collar mounting hole 130.

Figure 5:
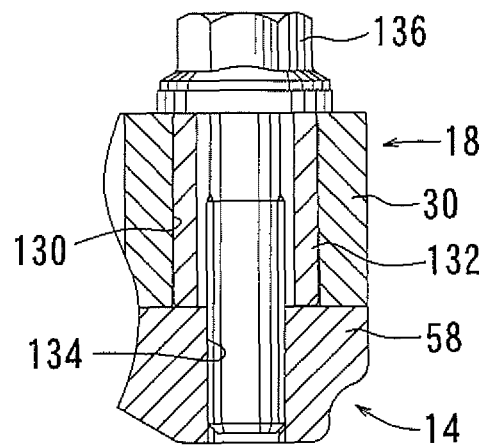
FIG. 5 is a cross sectional view taken along line V-V in FIG. 1.
Figure 6:
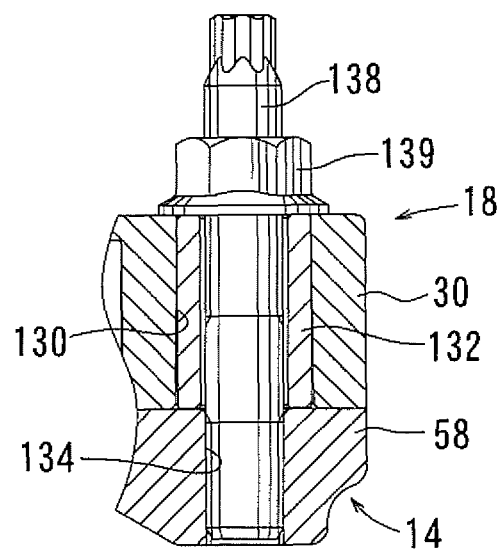
FIG. 6 is a cross sectional view taken along line VI-VI in FIG. 1.

A process of fastening the manifold body 12 and the connection member 14 together will now be described with reference to FIGS. 5 and 6 showing cross sectional views taken along line V-V and VI-VI in FIG. 1, respectively.

As shown in FIGS. 5 and 6, a cylindrical tubular collar 132 made of metal is coaxially fitted into each collar mounting hole 130. As for the collar mounting holes 130 formed in the rear portion of the connection flange 30, a headed bolt 136 is inserted into each collar 132 and is engaged with the corresponding threaded hole 134 so as to be tightened thereinto as shown in FIG. 5. As for the collar mounting holes 130 formed in the front portion of the connection flange 30, as shown in FIG. 6, a stud bolt 138 is inserted into each collar 132 and is engaged with and tightened into the corresponding threaded hole 134. Thereafter, a nut 139 is engaged with and tightened against the stud bold 138.

In this way, the manifold body 12 (more specifically, the connection flange 30 of the first piece 18) and the connection member 14 (more specifically, the connection flange 58) are fastened together (see FIGS. 1 and 2). Because the first piece 18 is a resin-molded product, there is a possibility that distances between the axes of collar mounting holes 130 become irregular. Therefore, in the above example, in order to absorb such irregularity, the sizes of the headed bolts 136 (more specifically, their shanks) and the stud bolts 138 and/or the sizes of the collars 132 are determined such that the headed bolts 136 (more specifically, their shanks) and the stud bolts 138 are loosely inserted into the collars 132 (see FIGS. 5 and 6). The selection between the headed bolts 136 and the stud bolts 138 can be arbitrary made and is not limited to the above example.

Structure for Positioning Between Manifold Body and Connecting Member

As shown in FIG. 17, a pair of right and left reference pins 141 and 142 are formed integrally with the end surface of the connection flange 30 of the first piece 18 and are positioned at rear parts of intermediate portions between the opposite end portions and the central portion of the connection flange 30. The reference pin 141 positioned on the right side as viewed in FIG. 17 has a cylindrical configuration and serves as a main reference pin. Therefore, the reference pin 141 will be also referred to as a main reference pin 141. The reference pin 142 positioned on the left side has an oblong cross section and serves as an auxiliary reference pin. Therefore, the reference pin 141 will be also referred to as an auxiliary reference pin 142. The major axis of the oblong cross section of the auxiliary reference pin 142 is oriented in a direction perpendicular to the lengthwise direction of the connection flange 30 (i.e. forward and rearward directions), while its semiminor axis is oriented in the lengthwise direction of the connection flange 30 (i.e., left and right directions). It may be possible to configure the reference pins 141 and 142 as separate parts from the first piece 18. In such a case, the reference pins 141 and 142 may be mounted to the connection flange 30 by press-fitting or any other suitable means.

As shown in FIG. 18, a pair of right and left reference holes 144 and 145 are formed in the downstream side connection flange 58 by boring processes using a drill or the like. The reference hole 144 positioned on the right side as viewed in FIG. 18 has a circular cross sectional configuration in order to coaxially receive the main reference pin 141 and will be also referred to as a main reference hole 144. The reference hole 145 positioned on the left side also has a circular cross sectional configuration in order to receive the auxiliary reference pin 142 and will be also referred to as an auxiliary reference hole 145. The diameter of the auxiliary reference hole 145 is set to be slightly larger than the size along the major axis of the oblong cross section of the auxiliary reference pin 142. Therefore, the auxiliary reference hole 145 can receive the auxiliary reference pin 142 while allowing potential offset of the auxiliary pin 142.

In order to fasten the manifold body 12 (more specifically, the connection flange 30 of the first piece 18) and the connection member 14 (more specifically, the connection flange 58) together, the reference pins 141 and 142 of the connection flange 30 (see FIG. 17) are inserted into the reference holes 144 and 145 of the connection flange 58 (see FIG. 18). Primary positioning between the connection flanges 30 and 58 can be achieved by the insertion of the main reference pin 141 into the main reference hole 144, and secondary positioning between them can be achieved by the insertion of the secondary reference pin 142 into the secondary reference hole 145. Therefore, a relatively large offset distance can be absorbed in the direction of the semiminor axis of the auxiliary reference pin 142 or the longitudinal direction of the connection flange 30, while a relatively small offset distance can be absorbed in the direction of the major axis of the auxiliary reference pin 142 or the direction perpendicular to the longitudinal direction of the connection flange 30. In this way, the connection flanges 30 and 58 can be positioned relative to each other.

With the above arrangement, the reference pins 141 and 142 are provided at the connection flange 30 of the first piece 18 made of resin and can be inserted into the circular reference holes 144 and 145 formed in the connection flange 58 made of metal. The reference pin 141 serves as a main reference pin having a circular cylindrical configuration while the reference pin 142 serves as an auxiliary reference pin having a configuration of an oblong column. The major axis direction of the auxiliary reference pin 142 intersects with the longitudinal direction of the connection flange 30. Therefore, even in the case that a relatively large variation has occurred in the distance or the pitch between the reference pins 141 and 142, fitting between the main reference pin 141 and the main reference hole 144 can position the main reference pin 141 and the main reference hole 144 coaxially with each other, and fitting between the auxiliary reference pin 142 and the auxiliary reference hole 145 can position the auxiliary reference pin 142 and the auxiliary reference hole 145 relative to each other while allowing or absorbing a relatively large variation in distance along the longitudinal direction of the connection flange 30 and a relatively small variation in distance along the direction perpendicular to the longitudinal direction of the connection flange 30. Therefore, it is possible to improve accuracy in positioning of the connection flange 30 and the connection flange 58 relative to each other. Eventually, it is possible to avoid potential formation of stepped portions between opening ends of the branch passages 28 and the communication passages 56 at the joint portion between the connection flange 30 and the connection flange 58.

Further, the reference holes 144 and 145 can be formed by boring circular holes in the metal connection member 14 (die-cast product) by using a drill or the like. Therefore, the reference holes 144 can be formed in the metal connection member 14 with high accuracy and at a lower cost. The positioning structure of this example can be applied to any other products or parts other than the intake manifold as long as positioning of parts are required. In addition, the positioning structure can be also applied to position metal parts or resin parts relative to each other in addition to the positioning of the metal part and the resin part.

Negative Pressure Takeout Passage

A negative pressure takeout passage 147 is provided at the manifold body 12 for taking out a negative pressure within the surge tank chamber 24 (see FIGS. 10 and 19).

Figure 16:
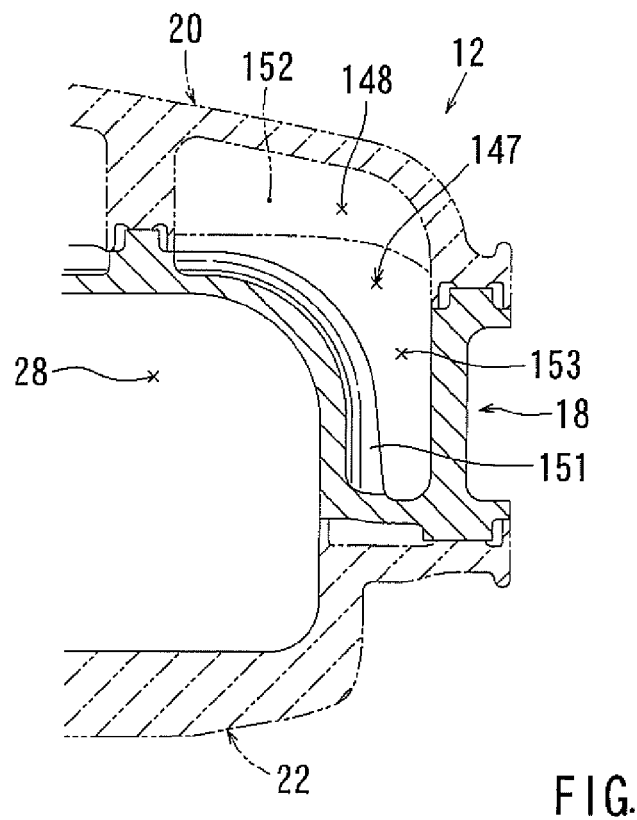
FIG. 16 is a cross sectional view taken along line XVI-XVI in FIG. 10.

As shown in FIG. 16 that is a cross sectional view taken along line XVI-XVI in FIG. 10, the negative pressure takeout passage 147 is formed when the first piece 18 and the second piece 20 are joined together. The negative pressure takeout passage 147 includes a negative pressure chamber and a negative pressure takeout port 149 provided at the second piece 20. The negative pressure chamber is defined by one of enlarged portions 148 (right side one in FIG. 10) extending from the right and left end portions of the surge tank chamber 24 to positions proximal to the right and left sides of the gas tank chamber 95 (see FIG. 19). The enlarged portions 148 positioned on the right side (left side in FIG. 19) is defined by an inlet edge portion 151 of the rightmost branch passage 28 and a shield wall 152 formed in the rear side portion of the second piece 20 to correspond to the inlet edge portion 151. A communication passage 153 communicating between the surge tank chamber 24 and the right side enlarged portion 148 is defined between the inlet edge portion 151 and the shield wall 152. Therefore, the inner spaces of the enlarged portions 148 serve as dead spaces through which no substantial flow of intake air is created. In this example, the negative pressure chamber is labeled with the same reference numeral 148 as the enlarged portion and will be referred to as a negative pressure chamber 148.

The negative pressure intake port 149 communicates with the negative pressure chamber 148 at the right side portion (as viewed in FIG. 10) of the second piece 20 and is configured such that its open end is oriented to the right (left in FIG. 19). An upstream side end of a negative pressure take out pipe 155 communicating with a brake booster (not shown) is connected to the negative pressure takeout port 149. Therefore, a negative pressure of intake air produced within the surge tank 24 can be taken out into the brake booster.

With the above arrangement, the negative pressure takeout port 149 communicates with the negative pressure chamber 148 that is separated from the surge tank chamber 24 by the shield wall 152 (see FIG. 19). Therefore, the shield wall 152 can inhibit flow of water that may be produced due to dew condensation into the negative pressure chamber 148, and hence, it is possible to prevent water from entering the negative pressure takeout pipe 155 and eventually from freezing and dew condensation of water within the negative pressure takeout pipe 155. Further, it is possible to prevent adhesion of deposit onto the inner wall of the negative pressure takeout pipe 155. Consequently, it is possible to prevent short of supply of negative pressure to the brake booster.

Purge Control Valve Mounting Structure

As shown in FIG. 20, a valve mounting arm 157 for mounting the purge control valve 75 is formed integrally with an outer surface of the left side wall defining the leftmost branch passage 28 of the third piece 22 and extends leftward therefrom. The valve mounting arm 157 and its related structure are shown in a front view and a side view in FIGS. 28 and 29, respectively.

Figure 28:
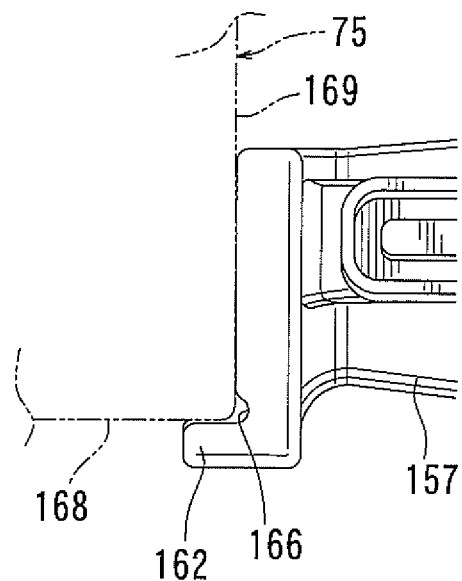
FIG. 28 is a front view of a valve mounting portion of the manifold body provided for mounting a purge control valve.
Figure 29:
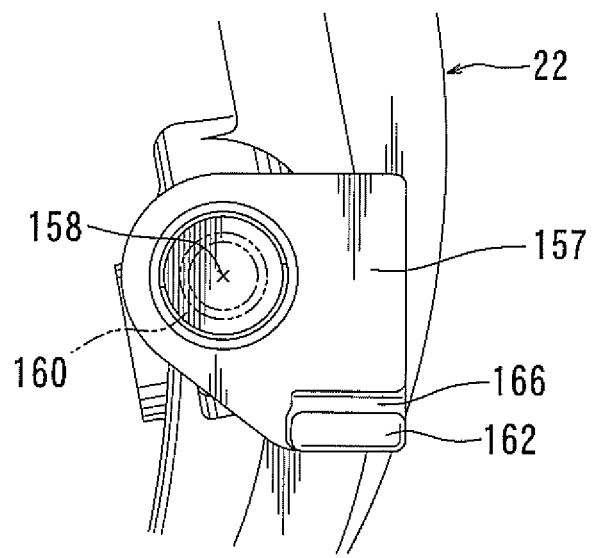
FIG. 29 is a side view of the valve mounting portion.

As shown in FIG. 29, a nut mounting hole 158 is formed in a leading end surface of the valve mounting arm 157, so that a nut 160 can be mounted coaxially within the nut mounting hole 158 by heat press-fitting or like means. A rotation preventing member 162 is formed integrally with a lateral side (lower side as viewed in FIG. 28) of the leading end portion of the valve mounting arm 157. On the other hand, as shown in FIG. 10, an arm reinforcing rib 164 is formed on the first piece 18 at a position opposed to the front side of the valve mounting arm 157. The arm reinforcing rib 164 can be welded to the valve mounting arm 157 at the same time the third piece 22 is welded to the first piece 18, so that the valve mounting arm 157 can be reinforced by the arm reinforcing rib 164. The purge control valve 75 can be fastened to the valve mounting arm 157 by way of a bolt (not shown) that is tightened into the nut 160 while the purge control valve 75 being prevented from rotation relative to the leading end portion of the valve mounting arm 157 by the rotation preventing member 162 as shown in FIG. 28. A groove 166 having a U-shaped cross section is formed in the leading end surface of the valve mounting arm 157 at a position on the inner side (upper side as viewed in FIG. 28) of the base end of the rotation preventing member 162 and extends along the rotation preventing member 162 (see FIG. 29). In this example, the cross section of the groove 166 is a semicircular configuration having a width of 2 mm and a radius of 1 mm.

With the above arrangement, portions of a lower surface 168 and a right surface 169 of the purge control valve 75 defining a corner therebetween can closely contact the leading end surface of the valve mounting arm 157 and the upper surface of the rotation preventing member 162. For example, in the case of an arrangement where no groove 166 is provided and a rounded inclination surface is formed at the corner between the leading end surface of the valve mounting arm 157 and the rotation preventing member 162 in order to ensure the strength of the rotation preventing member 162, the corner of the purge control valve 75 may interfere with the inclination surface, so that the portions of the lower surface 168 and the right surface 169 defining the corner of the purge control valve 75 cannot closely contact the leading end surface of the valve mounting arm 157 and the rotation preventing member 162 to degrade the rotation preventing function of the purge control valve 75. Further, the U-shaped groove 166 formed in the leading end surface of the valve mounting arm 157 along the base end of the rotation preventing member 162 can provide a rounded inclination surface to ensure the strength of the rotation preventing member 162.

Further, in the mounted state of the intake manifold 10 to the engine, a flow passage provided within the purge control valve 75 is positioned at a higher level than the purge gas introduction port 68 and the canister 76. Therefore, it is possible to prevent the purge gas from remaining within the flow passage of the purge control valve 75 when the engine is stopped.

Pressure Takeout Passage

As shown in FIG. 10, a pressure takeout passage 171 is defined in the manifold body 12 for taking out the pressure within the surge tank chamber 24. More specifically, the pressure takeout passage 171 is formed by joining the first piece 18 and the second piece 20 together. In FIGS. 10 and 19, portions or grooves of the first and second pieces 18 and 20 jointly defining the pressure takeout passage 171 are labeled with the same reference numeral 171 as the pressure takeout passage. The pressure takeout passage 171 extends in a substantially inverted L-shape along the joint surface between the first piece 18 and the upper wall portion of the second piece 20 and is positioned proximal to the right side of the upstream side passage portion 70. Therefore, the pressure takeout passage 171 is configured to have a substantially L-shaped tubular configuration. The lower end of the pressure takeout passage 171 communicates with the surge tank chamber 24. The upper end of the pressure takeout passage 171 communicates with a pressure takeout port 179 that is formed in the second piece 20. A portion of the second piece 20 around the pressure takeout port 179 is configured as a sensor mounting portion 180 (see FIG. 7).

A pressure sensor 182 can be fastened to the sensor mounting portion 180 by means of bolts or any other suitable fastening means (see FIGS. 1 to 3). A sensor probe of the pressure sensor 182 may be inserted into the pressure outlet port 179 at the time the pressure sensor 182 is fastened to the sensor mounting portion 180. Therefore, the pressure within the surge tank chamber 24 is detected by the pressure sensor 182 through the pressure intake passage 171. The ECU receives the detection signal from the pressure sensor 182, so that the ECU monitors the pressure within the surge tank chamber 24 and determines the difference between a pressure produced within the surge tank chamber 24 when the EGR valve provided in the EGR gas pipeline is opened and a pressure produced within the surge tank chamber 24 when the EGR gas valve is closed. When the pressure difference is equal to or more than a predetermined value, the ECU determines that the EGR valve properly works. If the pressure difference is smaller than the predetermined value, the ECU determines that the EGR valve does not properly work. Because the pressure intake passage 171 having a length and bent into L-shape is provided between the surge tank chamber 24 and the pressure sensor 182, it is possible to prevent impure substances, such as oil mist, from entering the pressure sensor 182 from the surge tank chamber 24.

Second Example

A second example will now be described with reference to FIGS. 30, 31 and 32 that show a front view of a manifold body of the second example, a sectional view taken along line XXXI-XXXI in FIG. 30 and a sectional view taken along line XXXII-XXXXII in FIG. 31, respectively. The second example is a modification of the first example. Therefore, in FIGS. 30 to 31, like members are given the same reference numerals as the first example and an explanation of these members will not be repeated.

Figure 30:
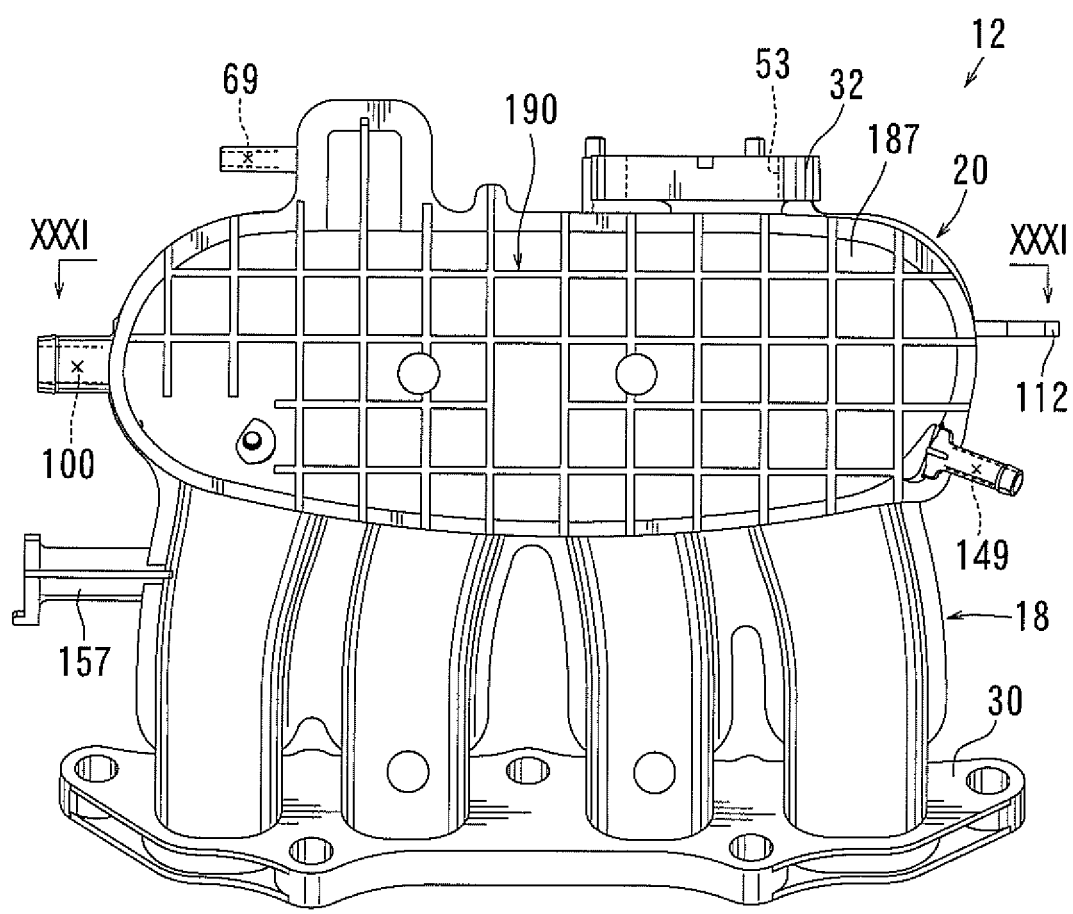
FIG. 30 is a front view of a manifold body of an intake manifold according to another example.
Figure 31:
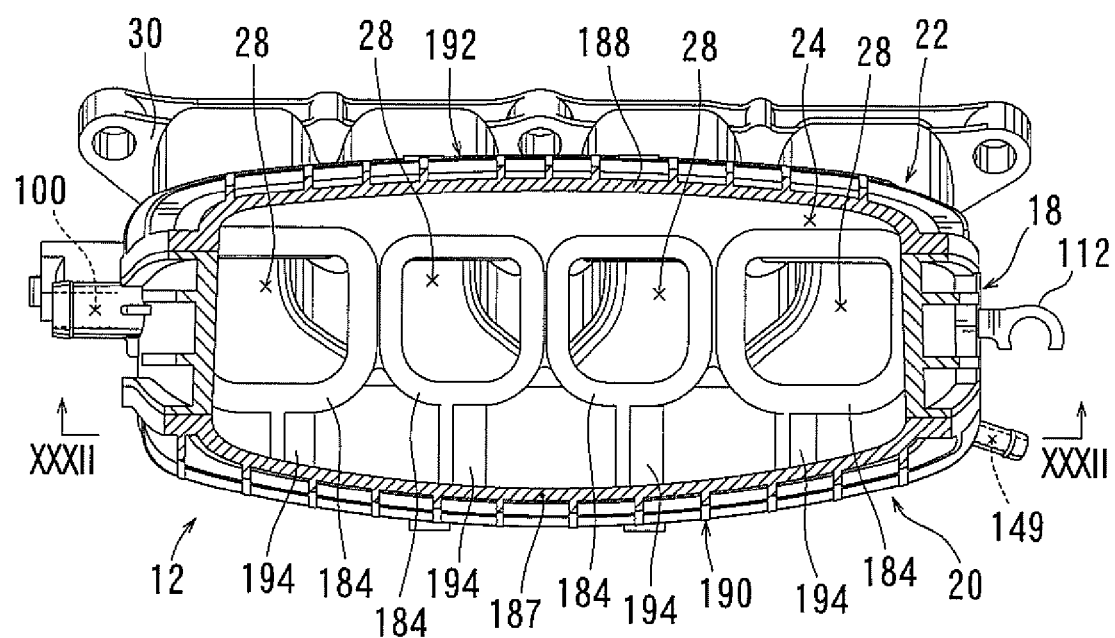
FIG. 31 is a cross sectional view taken along line XXXI-XXXI in FIG. 30.

As shown in FIGS. 30 and 31, in this example, the purge gas passage 68, the gas tank chamber 95 and the negative pressure chamber 148 of the first example are omitted, so that the surge tank chamber 24 has a volume greater than that in the first example. In this connection, the purge gas introduction port 69 and the blow-by gas introduction port 100 is molded integrally with the first piece 18 instead of the second piece 20. Further, in this example, the pressure takeout passage 171, the sensor mounting portion 180 and the pressure sensor 182 provided in the first example are omitted. Furthermore, the upstream side portions of the branch passages 28 are formed by inlet tubular portions 184 protruding into the surge tank chamber 24. The inlet tubular portions 184 extend to a position proximal to the central portion with respect to the vertical direction of the surge tank chamber 24 and have upper ends that have diameters increasing in an upward direction like funnels. In this example, the distance between the inlet tubular portions 184 and a front wall 187 of the surge tank chamber 24 is set to be larger than the distance between the inlet tubular portions 184 and a rear wall 188 of the surge tank chamber 24.

The front wall 187 of the surge tank chamber 24 is formed by the second piece 20 and closes the front side opening of the surge tank chamber 24. A grid-like rib 190 is formed on the outer surface or the front surface of the front wall 187 (see FIGS. 30 and 31), so that the rib 190 reinforces the front wall 187. The rear wall 188 of the surge tank chamber 24 is formed by the second piece 20 and closes the rear side opening of the surge tank chamber 24. Also, a grid-like rib 192 is formed on the outer surface or the rear surface of the rear wall 188 (see FIG. 31), so that the rib 192 reinforces the rear wall 188.

Figure 32:
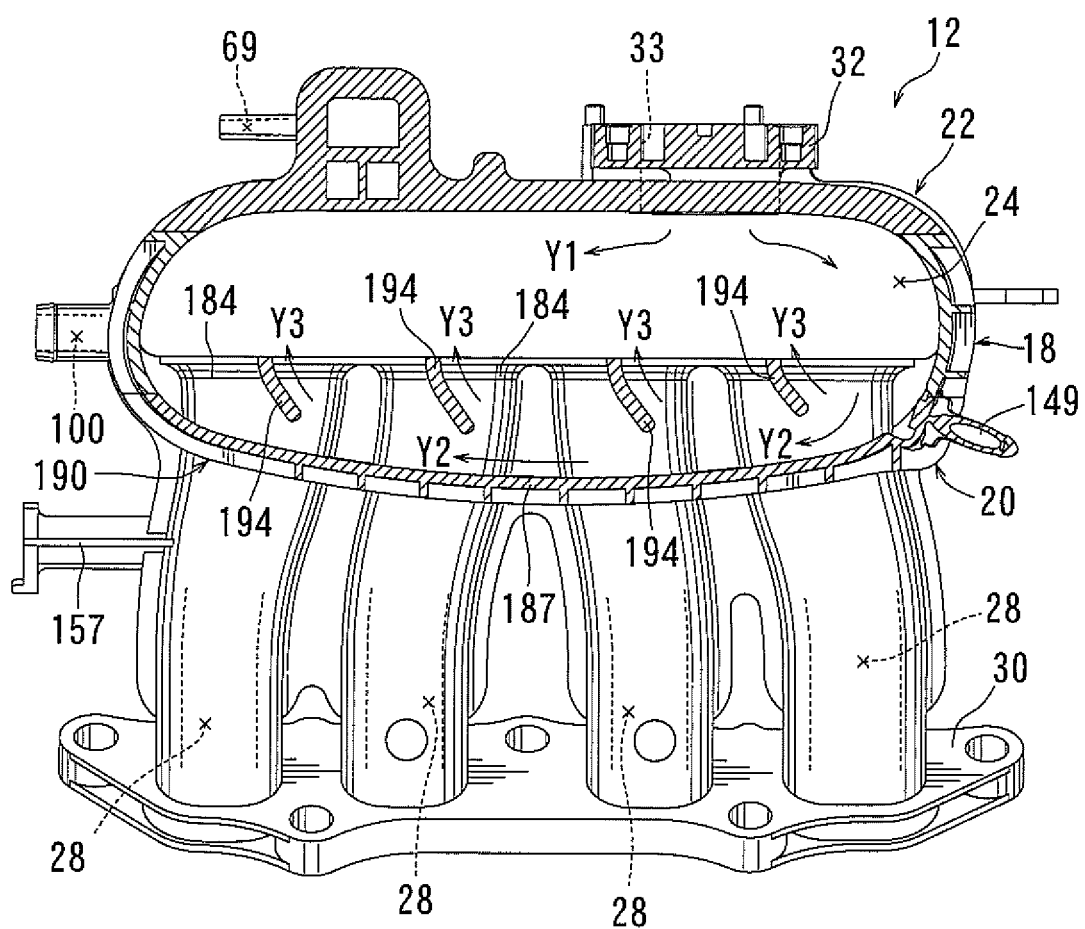
FIG. 32 is a cross sectional view taken along line XXXII-XXXII in FIG. 31.

As shown in FIG. 32, intake air flowing into the surge tank chamber 24 from the intake air introduction port 33 of the throttle mounting flange 32 produces main high-speed streams Y1 and turbulent streams Y2. The main streams Y1 start from the side of the intake air introduction port 33 and move toward the branch passages 28 across the surge tank chamber 24. The turbulent streams Y2 move across the dead space formed between the inlet tubular portions 184 of the branch passages 28 and the front wall 187 of the surge tank chamber 24. In some cases, the turbulent streams Y2 may prevent equalization of distribution of intake air into the branch passages 28. Therefore, in this example, flow control plates 194 are positioned between the upper halves of the inlet tubular portions 184 of the branch passages 28 and the front wall 187 of the surge tank chamber 24. The flow control plates 194 can guide the turbulent streams Y2 to be smoothly converged with the main streams Y1 as indicated by arrows Y3 in FIG. 32. As a result, it is possible to equalize the distribution of intake air into the branch passages 28 and to eventually improve the engine output.

Third Example

Figure 33:
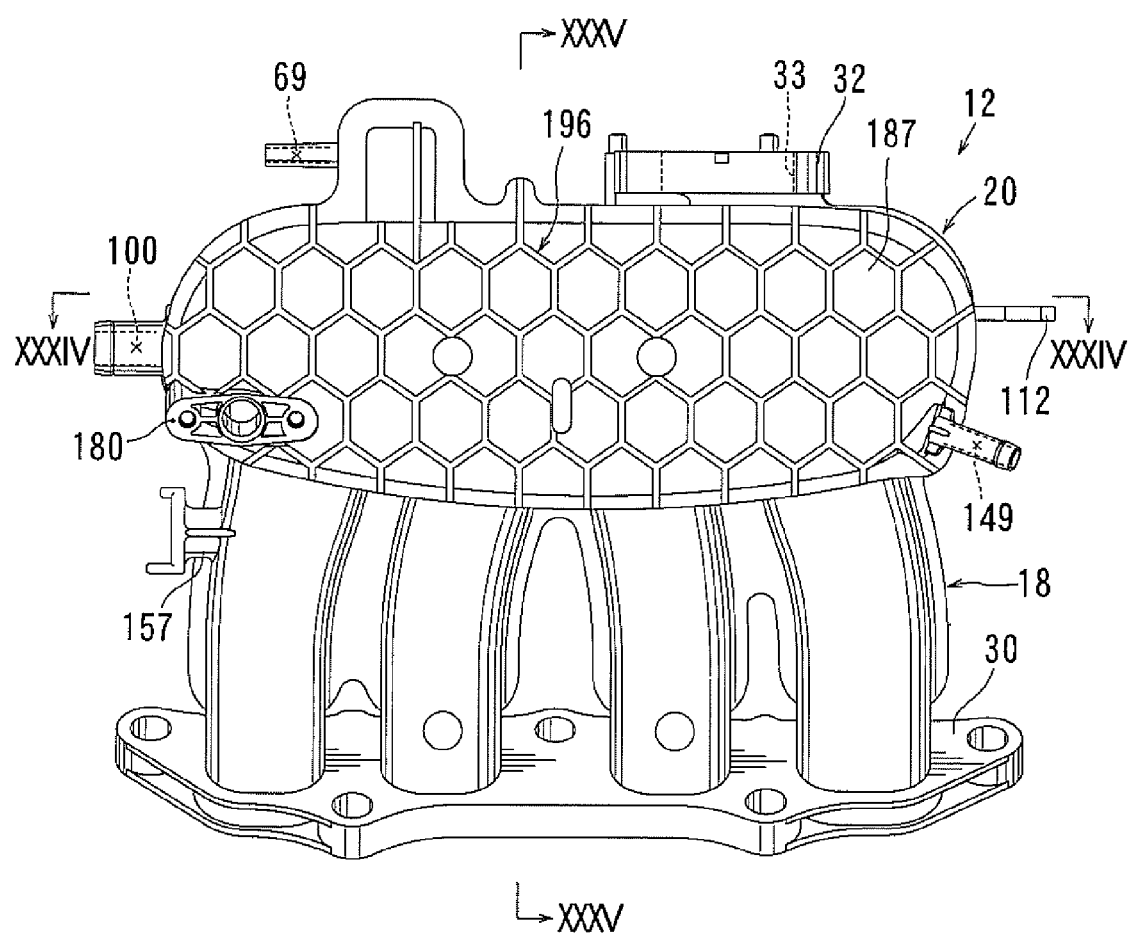
FIG. 33 is a front view of a manifold body of an intake manifold according to another example.
Figure 34:
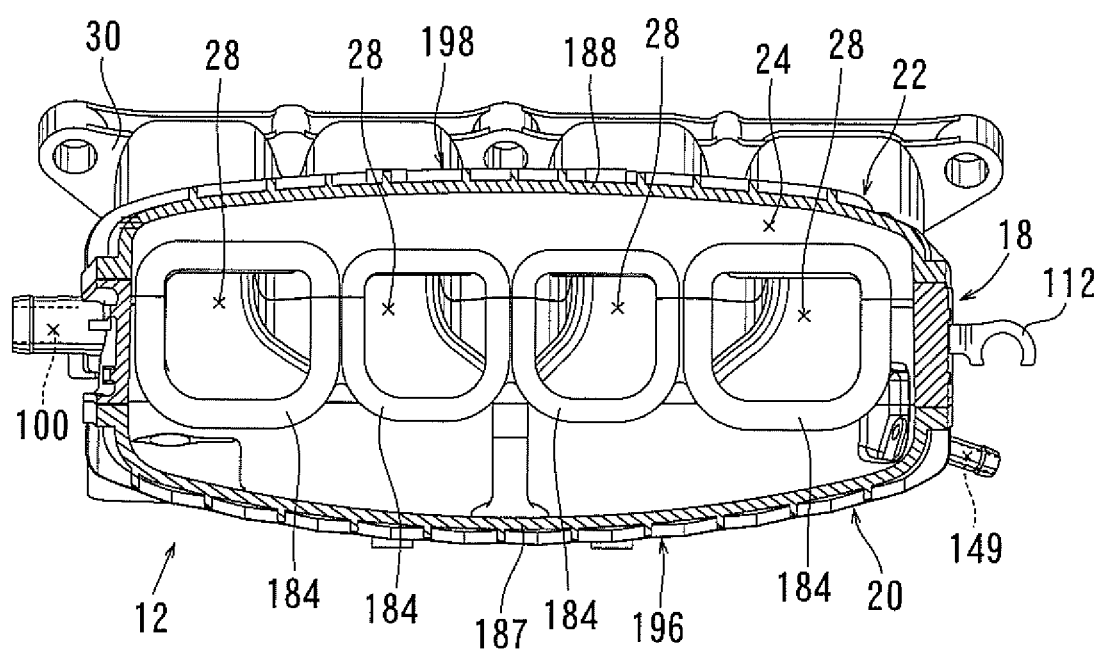
FIG. 34 is a cross sectional view taken along line XXXIV-XXXIV in FIG. 33.
Figure 35:
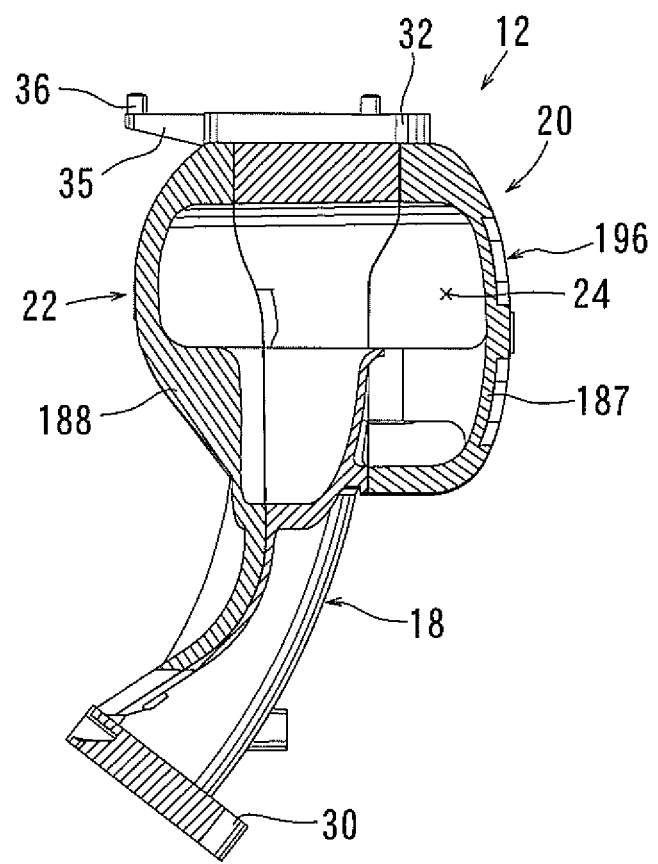
FIG. 35 is a cross sectional view taken along line XXXV-XXXV in FIG. 33.

A third example will now be described with reference to FIGS. 33, 34 and 35 that show a front view of a manifold body of the third example, a sectional view taken along line XXXIV-XXXIV in FIG. 33 and a sectional view take along line XXXV-XXXV in FIG. 33, respectively. The third example is a modification of the second example. Therefore, in FIGS. 33 to 35, like members are given the same reference numerals as the second example and an explanation of these members will not be repeated.

In this example, the flow control plates 194 of the second example are omitted. The sensor mounting portion 180 is provided at the left lower portion of the front wall 187 of the second piece 22.

On the outer surface of the front surface of the front wall 187 of the surge tank chamber 24, a honeycomb rib 196 is formed in place of the grid-like rib 190. Similarly, on the outer surface or the rear surface of the rear wall 188, a honeycomb rib 198 is formed in place of the grid-like rib 192 (see FIG. 34). Also with these arrangements, it is possible to improve the strength of the front wall 187 and the rear wall 188 of the surge tank chamber 24.

Unlike the grid-like ribs 190 and 192, the force is transmitted across the honeycomb ribs 196 and 198 in the radial direction. Therefore, it is possible to mitigate concentration of stress and to eventually improve the pressure resistant strength of the front and rear walls 187 and 188. In addition, the honeycomb ribs 196 and 198 can reduce vibrations of the front and rear walls 187 and 188. Further, one honeycomb segment of the honeycomb ribs 196 and 198 may have a large area than one grid segment of the grid-like ribs 190 and 192 having the same circumferential length as the honeycomb segment. Therefore, it is possible to reduce the amount of material and to reduce the material cost. Further, the honeycomb ribs 196 and 198 may give an excellent appearance than the grid-like ribs 190 and 192, and therefore, the intake manifold of this example is improved in terms of design.

Fourth Example

Figure 36:
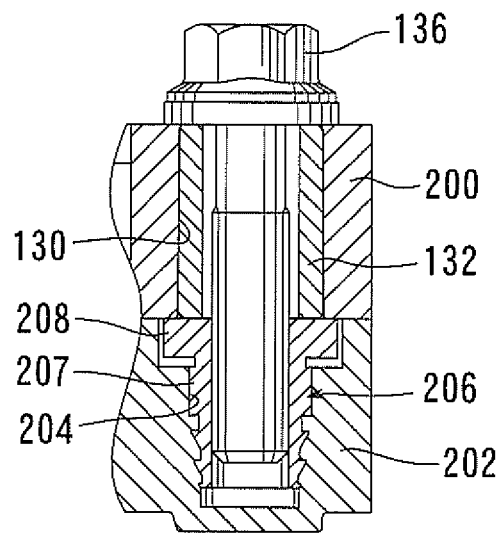
FIG. 36 is a cross sectional view showing a fastening structure using a headed bolt according to another example.
Figure 37:
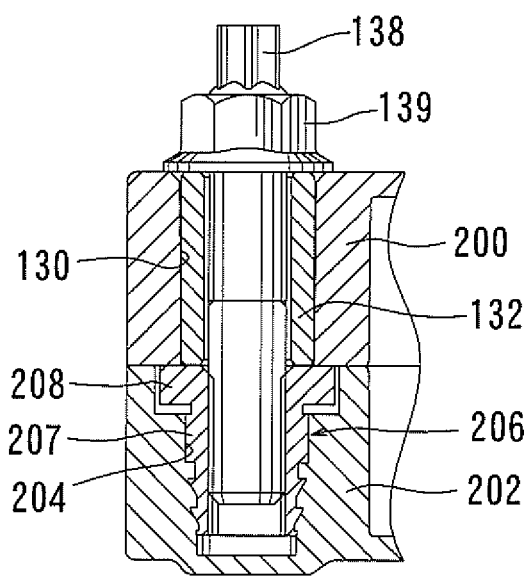
FIG. 37 is a cross sectional view showing a fastening structure using a stud bolt according to another example.

A fourth example will now be described with reference to FIGS. 36 and 37. The fourth example is a modification of fastening structures for fastening the connection flange 30 of the manifold body 12 to the connection flange 58 of the connection member 14 of the first example (see FIGS. 5 and 6). According to the fastening structures of the fourth example, the connection flanges 30 are 58 are replaced with flanges 200 and 202 shown in FIGS. 36 and 37. Both of the flanges 200 and 201 are made of resin Similar to the connection flange 30, the collar mounting holes 130 (only one collar mounting hole is shown in FIG. 36 or 37) are formed in the resin flange 200 and the cylindrical tubular collar 132 made of metal is coaxially fitted into each collar mounting hole 130. The resin flange 200 will be hereinafter also called "collar-side flange 200." On the other hand, a plurality of nut mounting holes 204 (only one nut mounting hole is shown in FIG. 36 or 37) corresponding to the collar mounting holes 130 are formed in the resin flange 204. A metal nut 206 is coaxially mounted within each nut mounting hole 204 by heat press-fitting or other suitable means. The resin flange 204 will be hereinafter also called "nut-side flange." The nut 206 includes a nut body 207 and a seat flange 208. The seat flange 208 is formed on the outer circumferential surface of an end portion of the nut body 207 on the side of the collar 132 that is seated against the seat flange 208. The seat flange 208 has an outer diameter larger than the outer diameter of the collar 132, so that the seat flange 208 defines a seat area having a large outer diameter for the collar 132. More specifically, the outer diameter of the seat flange 208 is set such that the collar 132 can contact the seat flange 208 of the nut 206 along the entire circumference even in the case that the headed bolt 136 (more specifically, its shank) or the stud bolt 138 has offset by a possible maximum distance from a set position.

Fastening Structure for Fastening Flanges Together by Using Headed Bolt

As shown in FIG. 36, the resin flanges 200 and 201 are fastened together by inserting the headed bolt 136 into the collar 132 of the collar-side flange 200, engaging the headed bolt 136 with the nut 206 of the nut-side flange 202, and tightening the headed bolt 136 into the nut Fastening Structure for Fastening Flanges Together by Using Stud Bolt As shown in FIG. 37, the resin flanges 200 and 201 are fastened together by inserting the stud bolt 138 into the collar 132 of the collar-side flange 200, engaging the stud bolt 138 with the nut 206 of the nut-side flange 202, and tightening the stud bolt 138 into the nut 206.

In the case of the fastening structure between the resin flanges 200 and 202, it may be possible to cause misalignment between the collars 132 and the nuts 206 due to constriction after the molding process or due to difference in heat expansion coefficient between the flanges 200 and 202. Therefore, in order to absorb such misalignment, the headed bolts 136 (more specifically, their shanks) and the stud bolts 138 are loosely inserted into the collars 132.

If no set flange 208 is provided on the nut 206, there is a possibility that a part of the collar 132 may not contact the nut body 207 when the headed bolt 136 (more specifically its shank) or the stud bolt 138 has offset by a possible maximum distance. In other words, the collar 132 may not contact the nut body 207 throughout the entire circumference. In such a case, a shearing force may be applied at the boundary between the nut body 207 and the nut-side flange 202, into which the nut body 207 is press-fitted. Hence, a problem may be caused that the nut body 207 is removed from the flange 202.

According to the nut 206 of this example, the collar 132 can contact the seat flange 208 of the nut 206 throughout the entire circumference even in the case that the headed bolt 136 (more specifically its shank) or the stud bolt 138 has offset by a possible maximum distance. Therefore, it is possible to avoid application of a shearing force at the boundary between the nut body 207 and the nut-side flange 202, into which the nut body 207 is press-fitted. Hence, a problem of removal of the nut body 207 from the flange 202 may not be caused. The fastening structure of this example may be applied to any other products or parts other than the intake manifold as long as resin flanges are required to be fastened to each other.

The above examples may be modified in various ways. For example, the intake manifolds of the above examples can be applied to engines having a number of cylinders other than four. In addition, although the intake manifold is constituted by the manifold body made of resin and the connection member made of metal in the above examples, the above teachings can be also applied to an intake manifold constituted by a resin manifold body and a resin connection member or to an intake manifold that is made entirely of resin. Further, although the manifold body of each example is separated into three parts, it may be possible to separate the manifold body into two or four or more parts.

This invention claims:

1. An intake manifold comprising:
a surge tank chamber;
a plurality of branch passages;
a gas tank chamber capable of introducing a gas and distributing the gas into the plurality of branch passages, wherein the gas is to be refluxed to an engine; and
a first manifold piece, a second manifold piece, and a third manifold piece made of resin and welded together to jointly form a circumferential wall defining therein the surge tank chamber; wherein:
the first manifold piece is positioned between the second manifold piece and the third manifold piece;
the circumferential wall of the surge tank chamber includes a side wall including a first boundary plane between the first manifold piece and the second manifold piece welded together and a second boundary plane between the first manifold piece and the third manifold piece welded together; and
the side wall has a double wall structure including an inner wall and an outer wall defining therebetween a communication passage communicating with the surge tank chamber.

2. The intake manifold as in claim 1, wherein the gas is a blow-by gas.

3. The intake manifold as in claim 1, wherein the gas is a purge gas.

4. The intake manifold as in claim 1, wherein passage walls defining the plurality of branch passages are formed integrally with a tank wall defining the gas tank chamber.

5. The intake manifold as in claim 1, wherein the surge tank chamber and the gas tank chamber are positioned proximal to each other with an intervention of a partition wall.

6. The intake manifold as in claim 1, wherein at least one of the first, second, and third manifold pieces includes a joint flange for welding to the other piece and has an outer surface including at least one reinforcing rib formed thereon, the joint flange includes a linear projection, the at least one reinforcing rib extends in a direction intersecting with the linear projection, and the linear projection is interrupted at a position where the at least one reinforcing rib intersects the linear projection.

7. The intake manifold as in claim 1, wherein a honeycomb rib is formed on an outer surface of the circumferential wall of the surge tank chamber.

8. The intake manifold as in claim 1, wherein:
the communication passage includes a first communication passage extending along the first boundary plane between the first manifold piece and the second manifold piece and a second communication passage extending along the second boundary plane between the first manifold piece and the third manifold piece, and
the first communication passage and the second communication passage communicate with each other.

9. The intake manifold as in claim 8, wherein:
the first manifold piece includes a first inner wall portion and a first outer wall portion disposed on a first side, and a second inner wall portion and a second outer wall portion disposed on a second side opposite to the first side;
the second manifold piece includes a third inner wall portion and a third outer wall portion;
the third manifold piece includes a fourth inner wall portion and a fourth outer wall portion;
the first inner wall portion and the third inner wall portion are welded together to form an inner wall of the first communication passage;
the first outer wall portion and the third outer wall portion are welded together to form an outer wall of the first communication passage;
the second inner wall portion and the fourth inner wall portion are welded together to form an inner wall of the second communication passage; and
the second outer wall portion and the fourth outer wall portion are welded together to form an outer wall of the second communication passage.

10. An intake manifold comprising:
a surge tank chamber capable of receiving a supply of intake air;
a plurality of branch passages communicating with the surge tank chamber, so that intake air entering the surge tank chamber can flow through the plurality of branch passages so as to be discharged from the intake manifold, a gas tank chamber capable of receiving a supply of a gas other than intake air and communicating with the plurality of branch passages, so that the gas entering the gas tank chamber can flow into the branch passages without flowing through the surge tank chamber; and a first manifold piece, a second manifold piece, and a third manifold piece made of resin and welded together to jointly form a circumferential wall defining therein the surge tank chamber; wherein:

the first manifold piece is positioned between the second manifold piece and the third manifold piece;

the circumferential wall of the surge tank chamber includes a side wall including a first boundary plane between the first manifold piece and the second manifold piece welded together and a second boundary plane between the first manifold piece and the third manifold piece welded together; and the side wall has a double wall structure including an inner wall and an outer wall defining therebetween a communication passage communicating with the surge tank chamber.

11. The intake manifold as in claim 10, wherein the gas is a reflux gas that is to be refluxed to an engine.

12. The intake manifold as in claim 11, wherein the reflux gas is a blow-by gas.

13. The intake manifold as in claim 12, further comprising a purge gas passage capable of receiving the supply of a purge gas, wherein the purge gas passage communicates with the surge tank chamber, so that the purge gas entering the purge gas passage can flow into the surge tank chamber.

14. The intake manifold as in claim 11, further comprising:

a manifold body including the first, second, and third manifold pieces and having therein the surge tank chamber, the plurality of branch passages and the gas tank chamber; and a connection member connectible to a downstream end of the manifold body and having therein a plurality of communication passages and an EGR gas introduction port;

wherein:

the communication passages are configured to be able to communicate with the branch passages of the manifold body, and the EGR gas introduction port communicates with the communication passages, so that an EGR gas can be introduced into the communication passages via the EGR gas introduction port.

15. The intake manifold as in claim 10, wherein:

the communication passage includes a first communication passage extending along the first boundary plane between the first manifold piece and the second manifold piece and a second communication passage extending along the second boundary plane between the first manifold piece and the third manifold piece, and the first communication passage and the second communication passage communicate with each other.

16. The intake manifold as in claim 15, wherein:

the first manifold piece includes a first inner wall portion and a first outer wall portion disposed on a first side, and a second inner wall portion and a second outer wall portion disposed on a second side opposite to the first side;

the second manifold piece includes a third inner wall portion and a third outer wall portion;

the third manifold piece includes a fourth inner wall portion and a fourth outer wall portion;

the first inner wall portion and the third inner wall portion are welded together to form an inner wall of the first communication passage;

the first outer wall portion and the third outer wall portion are welded together to form an outer wall of the first communication passage;

the second inner wall portion and the fourth inner wall portion are welded together to form an inner wall of the second communication passage; and the second outer wall portion and the fourth outer wall portion are welded together to form an outer wall of the second communication passage.

17. An intake manifold comprising:

a first manifold piece, a second manifold piece, and a third manifold piece made of resin and welded together to jointly form a circumferential wall defining therein a surge tank chamber; wherein:

the first manifold piece is positioned between the second manifold piece and the third manifold piece;

the circumferential wall of the surge tank chamber includes a side wall including a first boundary plane between the first manifold pieces and the second manifold piece welded together and a second boundary plane between the first manifold piece and the second manifold piece welded together;

the side wall has a double wall structure including an inner wall and an outer wall defining therebetween a communication passage communicating with the surge tank chamber.

18. The intake manifold as in claim 17, wherein at least one of the first, second, and third manifold pieces includes a joint flange for welding to the other manifold piece and has an outer surface including at least one reinforcing rib formed thereon, the joint flange includes a linear projection, the at least one reinforcing rib extends in a direction intersecting with the linear projection, and the linear projection is interrupted at a position where the at least one reinforcing rib intersects the linear projection.

19. The intake manifold as in claim 17, wherein a honeycomb rib is formed on an outer surface of the circumferential wall of the surge tank chamber.

20. The intake manifold as in claim 17, wherein:

the communication passage includes a first communication passage extending along the first boundary plane between the first manifold piece and the second manifold piece and a second communication passage extending along the second boundary plane between the first manifold piece and the third manifold piece, and the first communication passage and the second communication passage communicate with each other.

21. The intake manifold as in claim 20, wherein:

the first manifold piece includes a first inner wall portion and a first outer wall portion disposed on a first side, and a second inner wall portion and a second outer wall portion disposed on a second side opposite to the first side;

the second manifold piece includes a third inner wall portion and a third outer wall portion;

the third manifold piece includes a fourth inner wall portion and a fourth outer wall portion;

the first inner wall portion and the third inner wall portion are welded together to form an inner wall of the first communication passage;

the first outer wall portion and the third outer wall portion are welded together to form an outer wall of the first communication passage;

the second inner wall portion and the fourth inner wall portion are welded together to form an inner wall of the second communication passage; and the second outer wall portion and the fourth outer wall portion are welded together to form an outer wall of the second communication passage.

\* \* \* \* \*